US012321534B2

(12) United States Patent
Malafeew et al.

(10) Patent No.: US 12,321,534 B2
(45) Date of Patent: Jun. 3, 2025

(54) VIRTUAL REALITY MOTION CONTROL

(71) Applicant: Virzoom, Inc., Cambridge, MA (US)

(72) Inventors: Eric Malafeew, Burlington, MA (US); Jason Warburg, Wells, ME (US)

(73) Assignee: Virzoom, Inc., Waltham, MA (US)

( * ) Notice: Subject to any disclaimer, the term of this patent is extended or adjusted under 35 U.S.C. 154(b) by 0 days.

(21) Appl. No.: 18/242,770

(22) Filed: Sep. 6, 2023

(65) Prior Publication Data

US 2024/0077957 A1 Mar. 7, 2024

Related U.S. Application Data

(60) Provisional application No. 63/403,979, filed on Sep. 6, 2022.

(51) Int. Cl.
*G06F 3/0346* (2013.01)
*G06F 1/16* (2006.01)
*G06F 3/01* (2006.01)
*G06T 11/00* (2006.01)

(52) U.S. Cl.
CPC ............ *G06F 3/0346* (2013.01); *G06F 1/163* (2013.01); *G06F 3/012* (2013.01); *G06T 11/00* (2013.01)

(58) Field of Classification Search
None
See application file for complete search history.

(56) References Cited

U.S. PATENT DOCUMENTS 10,109,113 B2 * 10/2018 Chenglei ............... G06F 3/011
11,191,996 B2    12/2021 Fung 2009/0058850 A1 *  3/2009 Fun ..................... A63F 13/211
                                              345/419
2020/0238177 A1 *  7/2020 Black .................. A63F 13/213
2021/0256769 A1 *  8/2021 Bailey .................... G06F 3/011
(Continued)

FOREIGN PATENT DOCUMENTS

WO   WO 2014100484        6/2014

OTHER PUBLICATIONS

Adhikari et al., "Improving Spatial Orientation in Virtual Reality with Leaning-based Interfaces," Thesis Submitted in Partial Fulfillment of the Requirements for the Degree of Master of Science, Spring 2021, 82 pages.

(Continued)

*Primary Examiner* — Benjamin C Lee
*Assistant Examiner* — Emily J Frank
(74) *Attorney, Agent, or Firm* — Fish & Richardson P.C.

(57) ABSTRACT

A virtual reality (VR) control method includes displaying, by a VR device, a VR environment. The VR environment is presented from a perspective in the VR environment that is defined with respect to a reference frame in the VR environment. A graphical indicator of a current real-world position of the VR device with respect to a real-world reference position is displayed. The graphical indicator tracks the perspective during movement of the perspective to remain displayed during the movement of the perspective. The method includes determining a velocity of the reference frame based on a displacement between the current real-world position and the real-world reference position; and translating the reference frame in the VR environment at the velocity.

32 Claims, 12 Drawing Sheets

(56) References Cited

U.S. PATENT DOCUMENTS

2022/0337805 A1* 10/2022 Shimizu .................. H04N 5/66
2024/0082713 A1* 3/2024 Sawaki .................. G06T 15/20

OTHER PUBLICATIONS

Adhikari et al., "Integrating Continuous and Teleporting VR Locomotion into a Seamless "HyperJump" Paradigm," IEEE Transaction on Visualization and Computer Graphics TVCG, Mar. 27-Apr. 1, 2021, pp. 1-18.

Adhikari et al., "Integrating Continuous and Teleporting VR Locomotion into a Seamless "HyperJump" Paradigm," 2021 IEEE Conference on Virtual Reality and 3D User Interfaces Abstracts and Workshops (VRW), 2021, pp. 370-372.

Hashemian et al., "Leaning-based interfaces improve ground-based VR locomotion in reach-the-target, follow-the-path, and racing tasks," IEEE Transactions on Visualization and Computer Graphics, Nov. 30, 2021, 29(3):1748-1768 (Abstract).

Ispace.iat.sfu.ca/ [online], "Integrating Continuous and Teleporting VR Locomotion into a Seamless "HyperJump" Paradigm," available on or before Oct. 18, 2021, retrieved Nov. 20, 2023, retrieved from URL<http://ispace.iat.sfu.ca/project/hyperjump/>, 3 pages.

Riecke et al., "Continuous vs. Discontinuous (Teleport) Locomotion in VR: How Implications can Provide both Benefits and Disadvantages," 2021 IEEE Conference on Virtual Reality and 3D User Interfaces Abstracts and Workshops (VRW), 2021, pp. 373-374.

Riecke et al., "HyperJump: Merging Teleporting and Continuous VR Locomotion into one Paradigm," ICSC 2021: 8th International Conference on Spatial Cognition, Sep. 13-17, 2021, 1 page.

Sargunam et al., "Guided Head Rotation and Amplified Head Rotation: Evaluating Semi-natural Travel and Viewing Techniques in Virtual Reality," IEEE Conference on Virtual Reality and 3D User Interfaces, Mar. 18, 2017, pp. 19-28.

Smeddinck et al. "Hoverboard: A Leap to the Future of Locomotion in VR !? ," 16th International Conference on Entertainment Computing (ICEC), Sep. 2017, pp. 218-225.

Techradar.com [online], "HyperJump wants to cure the motion sickness caused by your Oculus Quest 2," Aug. 22, 2022, retrieved on Nov. 20, 2023, retrieved from URL<https://www.techradar.com/news/hyperjump-wants-to-cure-the-motion-sickness-caused-by-your-oculusquest-2>, 12 pages.

Wang et al., "Comparing Isometric and Elastic Surfboard Interfaces for Leaning-Based Travel in 3D Virtual Environments," IEEE Symposium on 3D User Interfaces, Mar. 4-5, 2012, pp. 31-38 (Abstract).

Extended European Search Report in European Appln. No. 23195816.6, mailed on Jan. 19, 2024, 9 pages.

Marsh et al., "The cognitive implications of semi-natural virtual locomotion," Virtual Reality (VR), Mar. 4, 2012, pp. 47-50.

\* cited by examiner

Display, by a VR device, a VR environment, the VR environment presented from a perspective in the VR environment that is defined with respect to a reference frame in the VR environment, and a graphical indicator of a current real-world position of the VR device with respect to a real-world reference position. The graphical indicator tracks the perspective during movement of the perspective to remain displayed during the movement of the perspective

802

Determine a velocity of the reference frame based on a displacement between the current real-world position and the real-world reference position

804

Translate the reference frame in the VR environment at the velocity.

VIRTUAL REALITY MOTION CONTROL

CROSS REFERENCE TO RELATED APPLICATIONS

This application claims the benefit of U.S. Provisional Patent Application No. 63/403,979, filed on Sep. 6, 2022, the entirety of which is incorporated herein by reference.

FIELD OF THE DISCLOSURE

Technologies are described for controlling motion in virtual environments.

BACKGROUND

In a virtual reality (VR) process, a user is presented with a simulated VR environment, often using a display in a VR headset. The user is provided with one or more mechanisms by which to control movement of and interact with objects and perspectives in the VR environment. Such mechanisms include 3D mice, controllers (e.g., including joysticks and/or motion controllers), etc. Virtual reality sickness is linked to mismatches between simulated motion and physically-perceived motion.

SUMMARY

According to one aspect of the disclosed technologies, a virtual reality (VR) control method includes displaying, by a VR device, a VR environment. The VR environment is presented from a perspective in the VR environment that is defined with respect to a reference frame in the VR environment. A graphical indicator of a current real-world position of the VR device with respect to a real-world reference position is displayed. The graphical indicator tracks the perspective during movement of the perspective to remain displayed during the movement of the perspective. The method includes determining a velocity of the reference frame based on a displacement between the current real-world position and the real-world reference position; and translating the reference frame in the VR environment at the velocity.

Implementations of this and other VR control methods described herein can have one or more of at least the following characteristics.

In some implementations, a speed of the velocity is based on a magnitude of the displacement between the current real-world position and the real-world reference position.

In some implementations, the speed increases with increasing magnitude of the displacement between the current real-world position and the real-world reference position, over at least a portion of a range of displacements between the current real-world position and the real-world reference position.

In some implementations, the portion of the range of displacements is a first portion. In a second portion of the range of displacements between the current real-world position and the real-world reference position, the speed decreases with increasing magnitude of the displacement between the current real-world position and the real-world reference position. The second portion includes larger magnitudes of displacement than the first portion.

In some implementations, a direction of the velocity, with respect to a fixed coordinate system of the VR environment, is independent of a real-world orientation of the VR device.

In some implementations, the graphical indicator includes a feature that indicates a direction of the velocity with respect to an orientation of the perspective. The feature moves based on changes in the orientation of the perspective, such that the feature indicates the direction of the velocity independent of the changes in the orientation of the perspective.

In some implementations, the feature points in the direction of the velocity of the reference frame.

In some implementations, a direction of a predetermined portion of the graphical indicator with respect to the feature matches a direction of the real-world reference position with respect to the current real-world position of the VR device.

In some implementations, a distance between the feature and a predetermined portion of the graphical indicator is based on a magnitude of the displacement between the current real-world position of the VR device and the real-world reference position.

In some implementations, an orientation of the reference frame is independent of a real-world orientation of the VR device.

In some implementations, the perspective in the VR environment is based on a position of the reference frame, a local displacement with respect to the reference frame, and an orientation of the perspective with respect to the reference frame.

In some implementations, the method includes determining a second real-world position of the VR device; determining that the second real-world position does not satisfy a threshold condition with respect to the real-world reference position; and, in response to determining that the second real-world position does not satisfy the threshold condition with respect to the real-world reference position, altering the local displacement based on the second real-world position, and setting the velocity of the reference frame to zero.

In some implementations, altering the local displacement includes moving the local displacement at a speed that is based on a movement speed of the VR device.

In some implementations, the method includes determining an orientation of the perspective in the VR environment based on a real-world orientation of the VR device.

In some implementations, the method includes identifying a change in a real-world orientation of the VR device; and altering the graphical indicator based on the change in the real-world orientation.

In some implementations, altering the graphical indicator includes rotating a feature of the graphical indicator.

In some implementations, the method includes displaying the graphical indicator at a pitched angle with respect to the perspective.

In some implementations, for a range of magnitudes of the displacement up to at least a threshold value, a speed of the reference frame is a continuous function of a magnitude of the displacement, and the threshold value is between 2.5 feet and six feet.

In some implementations, the method includes determining a second real-world position of the VR device; determining that a magnitude of a displacement between the second real-world position and the real-world reference position is less than a threshold value; and in response to determining that the magnitude of the displacement between the second real-world position and the real-world reference position is less than the threshold value, setting the velocity of the reference frame to zero.

In some implementations, the graphical indicator includes an indicator of the threshold value with respect to the real-world reference position.

In some implementations, determining the velocity of the reference frame includes determining the velocity based on at least one of a feature in the VR environment, or a game state of a VR game that includes the VR environment.

In some implementations, a speed of the velocity of the reference frame is based on a real-world height of the VR device with respect to a real-world reference height.

In some implementations, the method includes determining a second real-world position of the VR device; determining that the second real-world position is beyond a real-world bound; and determining the velocity of the reference frame based on the determination that the second real-world position is beyond the real-world bound.

In some implementations, the method includes, in response to determining that the second real-world position is beyond the real-world bound, displaying a graphical notification of out-of-bounds real-world movement.

In some implementations, the graphical indicator includes an indicator of the real-world bound with respect to the real-world reference position.

In some implementations, the graphical indicator includes a first graphical feature indicating the current real-world position of the VR device; and a second graphical feature indicating the real-world reference position.

In some implementations, the method includes moving the first graphical feature based on real-world movements of the VR device.

In some implementations, a relative positioning of the first graphical feature and the second graphical feature indicates a direction of the VR velocity.

In some implementations, a relative positioning of the first graphical feature and the second graphical feature is based on a real-world orientation of the VR device.

In some implementations, the first graphical feature includes a marker, and the second graphical feature includes a ring.

In some implementations, the graphical indicator is included in a heads-up display (HUD) displayed by the VR device.

In some implementations, the VR device includes a VR headset.

According to another aspect of the disclosed technologies, one or more non-transitory computer-readable media store instructions that, when executed by one or more computer systems, cause the one or more computer systems to perform the VR control method or another VR control method.

According to another aspect of the disclosed technologies, a computer-implemented system includes one or more computers; and one or more computer memory devices interoperably coupled with the one or more computers. The one or more computer memory devices have non-transitory machine-readable media storing one or more instructions that, when executed by the one or more computers, cause the one or more computers to perform the VR control method or another VR control method.

According to another aspect of the disclosed technologies, a virtual reality (VR) headset includes a display; an inertial measurement unit (IMU) including one or more sensors; and one or more computer systems. The one or more computer systems are configured to perform that include: determining, based on data from the IMU, a current real-world position of the VR headset; and displaying, on the display, a VR environment, the VR environment presented from a perspective in the VR environment that is defined with respect to a reference frame in the VR environment, and a graphical indicator of the current real-world position of the VR headset with respect to a real-world reference position. The graphical indicator tracks the perspective during movement of the perspective to remain displayed during the movement of the perspective. The operations include determining a velocity of the reference frame based on a displacement between the current real-world position and the real-world reference position; and translating the reference frame in the VR environment at the velocity. The operations can include the VR control method described above, or another VR control method described in this disclosure.

According to another aspect of the disclosed technologies, a virtual reality (VR) control method includes displaying, by a VR device, a VR environment, the VR environment presented from a perspective in the VR environment that is defined with respect to a reference frame in the VR environment, and a graphical indicator of a current real-world position of a portion of a user with respect to a real-world reference position. The graphical indicator tracks the perspective during movement of the perspective to remain displayed during the movement of the perspective. The method includes determining a velocity of the reference frame based on a displacement between the current real-world position and the real-world reference position; and translating the reference frame in the VR environment at the velocity.

Particular aspects of the disclosed technologies can be implemented to realize one or more of the following potential advantages. In some implementations, perspective control can be made intuitive by basing reference frame velocity on real-world displacements. In some implementations, perspective control can be made intuitive by presenting a graphical indicator that indicates the velocity and/or the real-world displacements. In some implementations, perspective control can be based on reference frame translation (e.g., instead of reference frame teleportation) for a wider range of real-world movements, enhancing the fidelity of VR experiences. In some implementations, occurrences of VR sickness can be reduced by presentation of a graphical indicator that bridges the mental gap between real-world movements and VR movements.

Details of one or more implementations of the disclosed technologies are set forth in the accompanying drawings and the description below. Other features, aspects, descriptions and potential advantages will become apparent from the description, the drawings and the claims.

BRIEF DESCRIPTION OF THE DRAWINGS

FIG. 8 is a diagram illustrating an example of a VR control process.

Figure 1:
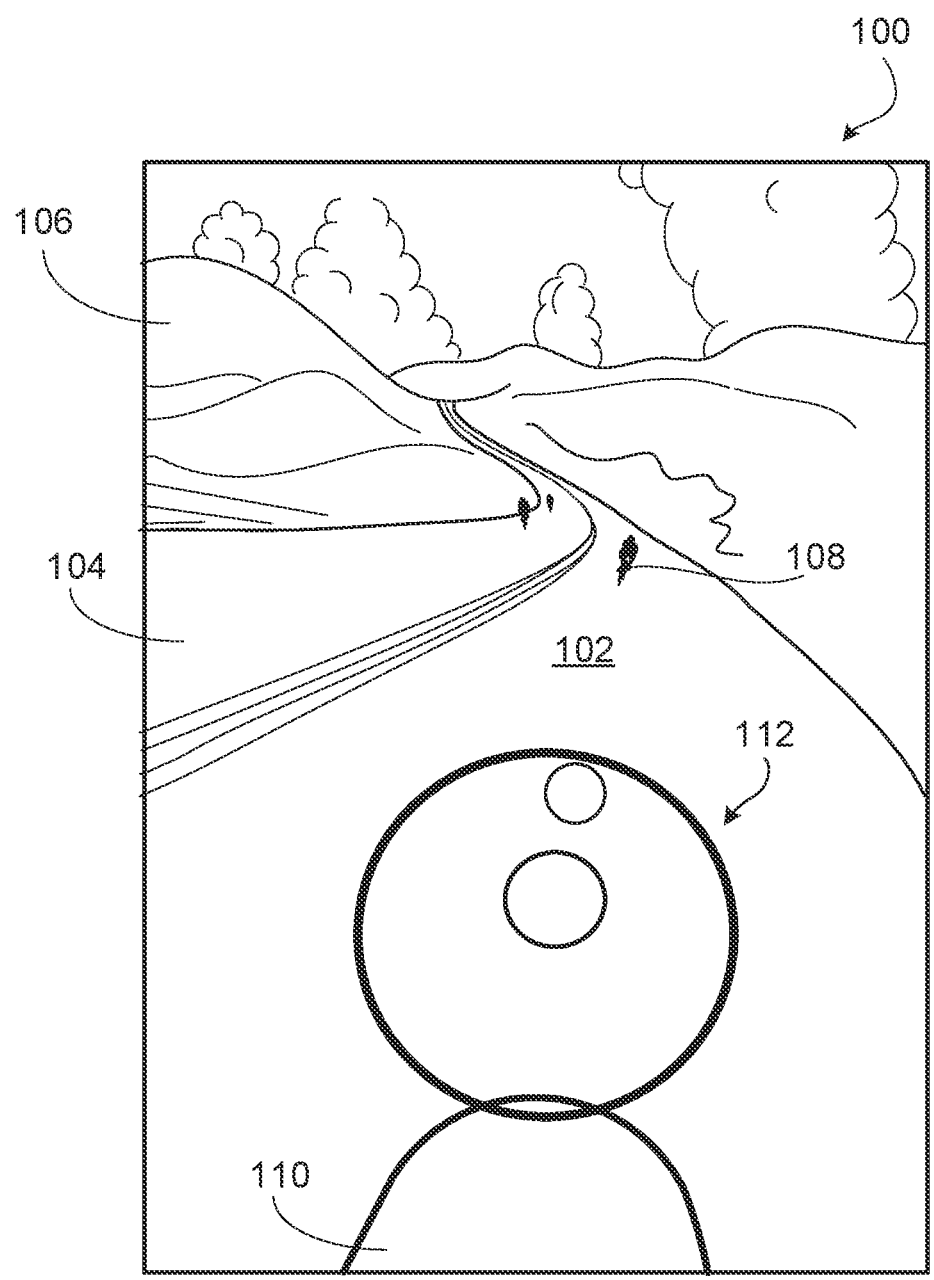
FIG. 1 illustrates an example of a VR display including a graphical indicator.

Certain illustrative aspects of the disclosed technologies are described herein in connection with the following description and the accompanying figures. These aspects are, however, indicative of but a few of the various ways in which the principles of the disclosed technologies may be employed, and the disclosed technologies are intended to include all such aspects and their equivalents. Other advantages and novel features of the disclosed technologies may become apparent from the following detailed description when considered in conjunction with the figures.

DETAILED DESCRIPTION

This disclosure describes, among other features, processes for intuitive virtual reality (VR) movement based on user positioning in combination with a dynamic graphical display. A VR device's displacement from a reference position is used to determine a velocity of a reference frame in a VR environment, correspondingly moving a perspective of the user in the VR environment. A graphical indicator tracks the perspective to remain presented (e.g., always, normally, etc.) to the user during navigation in the VR environment, the graphical indicator adapting dynamically to both VR device positioning and VR device orientation. Because the user has constant visual exposure to the graphical indicator, the user is provided with a more intuitive VR experience and can move more accurately and seamlessly in the VR environment. Moreover, the graphical indicator provides the user with a mental linkage between the VR environment and the user's real-world state, helping to reduce VR sickness.

Virtual reality (VR) environments have been widely implemented for recreation, fitness, education, employee training, and other purposes. Placed in a VR environment, a user is provided with one or more methods to control movement of the user's simulated perspective in the VR environment. However, existing movement methods are associated with various tradeoffs. Because of humans' innate movement awareness (such as accelerometry provided by the inner ear), and because the human mind generally perceives VR environments as fully real (unlike, for example, environments presented on televisions), differences between VR perspective movement and real-world movement can cause virtual reality sickness, which is estimated to impact at least 40% of users in typical VR applications and which may be observed in essentially all users for sufficient deviation between VR perspective movement and real-world movement.

To reduce VR sickness, VR systems that rely on manual device interactions for movement (e.g., hand-controlled joystick(s)) often move the user perspective by teleporting the perspective between two points or by shifting the perspective smoothly between two points without constant user control. However, these movement types represent breaks in the VR experience, depriving the user of a constant sense of control and accurate simulation. Moreover, when occupied by movement control, a user's hand(s) is/are not fully free to perform other functions, such as interacting with objects in the VR environment. As an alternative to manual devices, VR movement can be performed so as to mimic a user's real-world movements in an entirely one-to-one manner, e.g., so that, when a user steps forward in the real world, the user's perspective shifts forward by the same amount, without other movement control. However, in many practical situations, the user's movement is limited by the size of the room in which they are moving, correspondingly limiting the extent to which the VR perspective can move.

Implementations of the present disclosure include a displacement-based velocity determination process to move a reference frame through the virtual environment. A corresponding graphical indicator follows the user's perspective, providing the user with an intuitive visualization of the movement of the reference frame and the user's real-world position with respect to a reference position.

FIG. 1 illustrates an example of a VR display 100 provided by a VR device, such as a VR headset. The VR display 100 includes a VR environment 102. The VR environment 102 in this example includes VR features and landmarks such as a road 104, terrain 106, other characters 108, and a portion of the user's avatar 110. These VR features and landmarks exist in fixed or variable positions in the VR environment 102, and positions and orientations of the VR features and landmarks can be represented in a fixed VR coordinate system. At any given point in time during use of the VR device, only a portion of the VR environment 102 is displayed, as determined by a perspective that exists in the VR environment 102. For example, when the perspective points up (e.g., the user of the VR device looks up), a sky of the VR environment 102 can be displayed, and when the perspective points down, a ground of the VR environment 102 can be displayed. Some VR features may be blocked in the perspective by other VR features, such that appropriate movement of the perspective (e.g., rotation and/or position modification) is useful for revealing the blocked features. Movement of the perspective can be an important component of VR games, such as racing games and action games.

Figure 2:
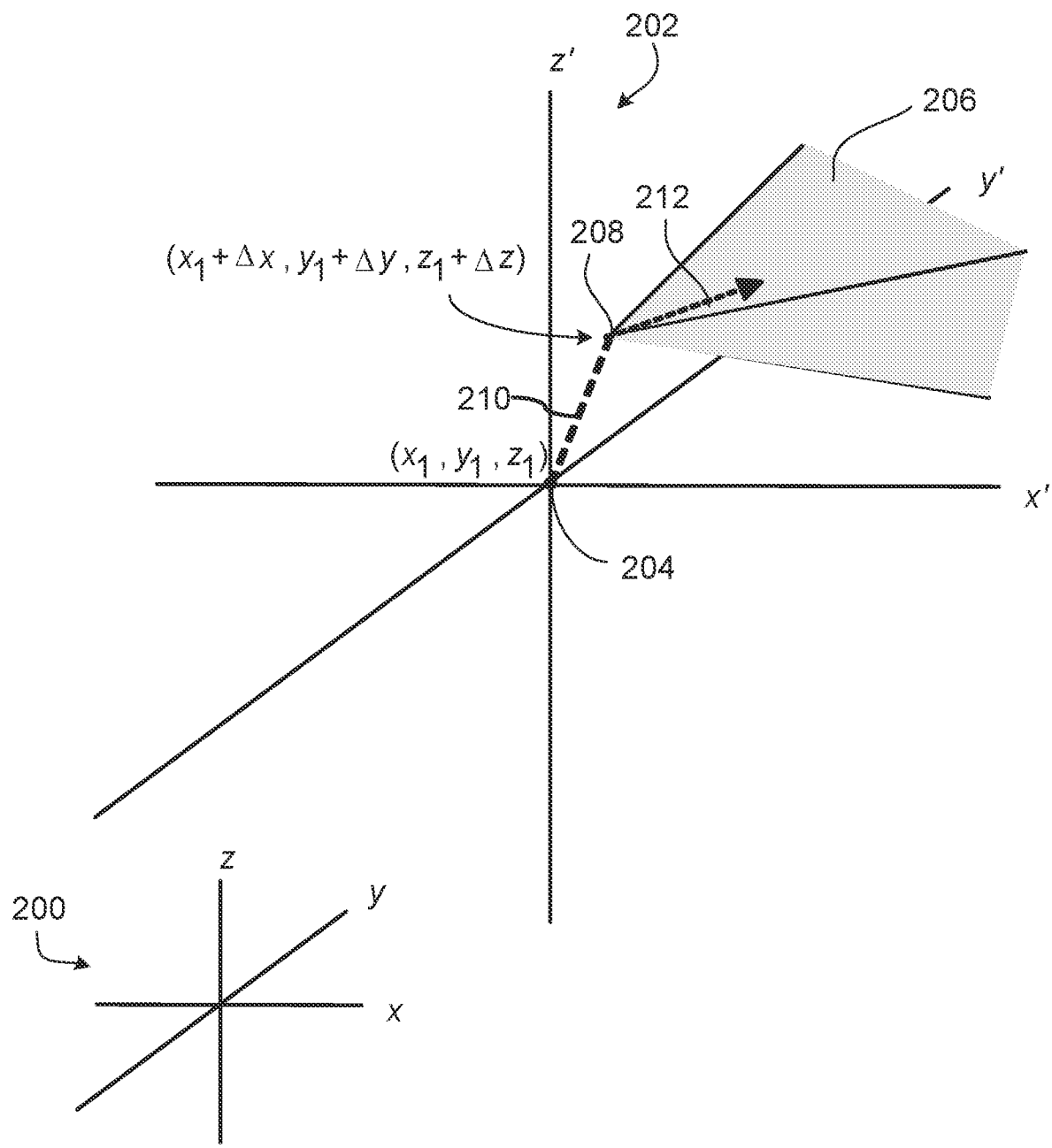
FIG. 2 is a diagram that illustrates a reference frame in a VR environment.

The perspective is defined in reference to a movable reference frame. FIG. 2 illustrates an example of a reference frame 202 having an origin 204 ($x_1$, $y_1$, $z_1$), as defined in reference to a fixed coordinate system 200 of a VR environment. A perspective 206 can include a position 208 and direction 212 from which the VR environment is displayed. The perspective 206 may be, but need not be, located at the origin 204. Rather, a position 208 of the perspective 206 can be locally displaced from the origin 204 by a local displacement 210 ($\Delta x$, $\Delta y$, $\Delta z$). The reference frame 202, such as the origin 204 of the reference frame 202, can move throughout the VR environment. For example, the reference frame 202 can translate in the x-y plane of the fixed coordinate system 200 (e.g., to simulate translation along a ground surface in the VR environment). In some implementations, the reference frame 202 can move vertically along the z-axis of the fixed coordinate system 200. In some implementations, the reference frame 202 does not rotate. For example, the x', y', and z' axes of the reference frame 202 can have a fixed angular relationship with the x, y, and z axes of the fixed coordinate system 200 (e.g., can be parallel to the x, y, and z axes, respectively). The direction 212 of the perspective 206 corresponds to an orientation of the perspective 206 with respect to the reference frame 202 and/or the fixed coordinate system 200. For example, the orientation of the perspective 206 can be defined by angles with respect to the x, y, and/or z axes of the fixed coordinate system and/or the x', y', and/or z' axes of the reference frame 202. Because, in some implementations, the reference frame 202 does not rotate, movement of the reference frame may have no effect on the direction/orientation of the perspective 206.

The perspective 206 is carried by the reference frame 202, such that changes to the position of the origin 204 are reflected in corresponding changes in the position 208 of the perspective 206. For example, assuming constant local displacement 210 of the perspective 206, when the origin 204 moves one meter in the y-direction (as defined in units of the VR environment), the perspective 206 also moves one meter in the y-direction. However, the possibility of changes to the local displacement 210 means that positional variation in the origin 204 of the reference frame 202 does not fully dictate positional variation in the position 208 of the perspective 206.

VR device movements with respect to a real-world reference position can cause corresponding changes in the local displacement 210 while also (as described in further detail below) adjusting a velocity of the reference frame. For example, if a user moves the VR device up (e.g., lifts their head vertically), $\Delta z$ can increase by a corresponding amount, e.g., so that the $\Delta z$ in the VR environment matches the real-world increase in the height of the VR device, to provide a high-fidelity VR experience. If the user moves the VR device to the right, the local displacement's 210 $\Delta x$ and/or $\Delta y$ can change to reflect the shift, with the relative amounts of $\Delta x$ and/or $\Delta y$ change dependent on a current orientation of the perspective. The local displacement 210 can be moved at a speed that is based on a movement speed of the VR device, e.g., so that faster movements of the VR device correspond to faster changes in the local displacement 210. In some implementations, a vector r describing the VR device's position with respect to a real-world reference position has substantially the same direction as the local displacement, e.g., $r=a(\Delta x, \Delta y, \Delta z)$, where a is a constant to convert from real-world units to VR environment units. The movement of the VR device can also cause a corresponding change to the velocity of the reference frame, as described in detail below.

Referring again to FIG. 1, and based on the description provided with respect to FIG. 2, a user can alter the perspective from which the VR environment 102 is displayed by one or any combination of (i) moving the reference frame so as to correspondingly move the perspective, (ii) moving the perspective with respect to the reference frame by altering the local displacement, and (iii) rotating the orientation of the perspective in one, two, and/or three dimensions, e.g., to "look around" the VR environment 102. The capability to detect these movement types and properly reflect the movement types in the VR display 100 (singly and/or simultaneously) permits a wide range of engaging movements by the user in the VR environment, such as strafing, sliding, ducking, and dodging.

Also illustrated in FIG. 1 is a graphical indicator 112. The graphical indicator 112 (described in additional detail at least in reference to FIGS. 3A-3F) tracks movements of the perspective so that the graphical indicator 112 remained displayed to the user during movement of the perspective, e.g., as a heads-up display (HUD) in the perspective. The constant or near-constant presence of the graphical indicator 112 in the user's view, in combination with dynamic features of the graphical indicator 112 (as described in further detail below), provides the user with an accurate sense of their positioning in the real world and permits intuitive control of the perspective in the VR environment 102.

FIGS. 3A-3F illustrate respective examples of (i) real-world positioning and orientation of a user, (ii) corresponding movement of a reference frame and orientation of the user with respect to the reference frame, and (iii) a corresponding graphical indicator that can be displayed to a user in association with the real-world positioning and orientation, according to some implementations of the present disclosure. In FIGS. 3A-3F, local displacements of the perspective are not illustrated. Moreover, "positions" and "displacements" as described in reference to FIGS. 3A-3F are lateral positions and lateral displacement, because, in some implementations, projections of the VR device position onto a lateral plane are used to determine reference frame velocity.

Several features give rise to the movements and graphical indicators illustrated in FIGS. 3A-3F. First, a velocity of the reference frame (e.g., a velocity of the origin of the reference frame), which includes a speed of the reference frame and a direction of movement of the reference frame, is determined based on a displacement between a real-world position of a VR device (e.g., positions 302a-f of FIGS. 3A-3F) and a real-world reference position (e.g., reference position 304 of FIGS. 3A-3F). A magnitude of the displacement (e.g., a magnitude of the lateral displacement) at least partially determines the speed of the reference frame. For example, for some distances between the real-world position and the real-world reference position, the speed can increase (e.g., in a linear manner) with increasing distance. As described in further detail below, the magnitude of the displacement can be decomposed along one or more axes to determine corresponding speeds of the reference frame along the one or more axes. Moreover, in some implementations, the magnitude of the displacement is merely one input for determination of the speed of the reference frame, which can also be based on VR game elements, user positioning distinct from movement with respect to the reference position, and/or other considerations. The displacement can be projected onto a lateral plane, such as a north/south/east/west plane, and the projected displacement can be used to determine the speed. For example, in some implementations, the speed is independent of the height of the VR device (except, in some cases, for a height-based modifier of the speed, described in further detail below); rather, the speed is determined based on the magnitude of the projected displacement in the lateral plane.

The direction of movement of the reference frame (with respect to a fixed coordinate system of the VR environment) is based on the direction of the user's real-world position with respect to the reference position. The real world-reference position is associated with a real-world reference orientation that corresponds to an orientation of the fixed coordinate system. For example, the real-world north direction of FIGS. 3A-3F is set to be parallel to a positive y'-axis direction of the fixed coordinate system of the VR environment, based on the VR device facing north when the reference position and reference orientation are initialized. The direction of the velocity of the reference frame is then set to match the heading of the user's position. For example, if the user, wearing the VR device, is standing north of the reference position (with no east-west deviation from the reference position), the reference frame moves in the positive y'-axis direction with respect to the fixed coordinate system. The displacement can be projected onto a lateral plane, such as a north/south/east/west plane, and the projected displacement can be used to determine the direction of the velocity. For example, in some implementations, a direction of the velocity is independent of a vertical position of the VR device; rather, the direction of the velocity is determined based on the projected displacement in the lateral plane.

As a second feature associated with some implementations of user movement, the direction of movement of the reference frame can be independent of a real-world orientation of the VR device. For example, because the real-world position of the VR device is independent of the orientation of the VR device (e.g., the VR device can be rotated/tilted without being moved laterally), changes in the orientation do not change the position of the VR device with respect to the reference position, and, accordingly, the direction of the velocity of the reference frame is independent of the orientation. However, the orientation of the VR device can be used to determine an orientation of the perspective in the VR environment. For example, the orientation of the perspective in the VR environment can match the orientation of the VR device. For example, if the user looks east in the real-world, the perspective in the VR environment faces in the positive x' direction, based on the alignment of the reference orientation with a corresponding direction in the VR environment, as described above. As another example, if the user happens to be facing south-east when the reference orientation is initialized, the south-east direction can be set as the positive y' direction in the VR environment. If the user then turns around to look northwest, the perspective in the VR environment will be oriented in the negative y'-axis direction. In practice, this means that a user can look around the VR environment by turning and tilting their head without substantially affecting the velocity of the reference frame (e.g., except for very slight changes due to the turning/tilting affecting the VR device's absolute position). Note that this method of control differs from the dual analog control method often employed in non-VR first-person video games, in which a "forward" movement selection with a joystick moves the perspective forward with respect to the perspective's current orientation, not with respect to an absolute direction.

Figure 3A:
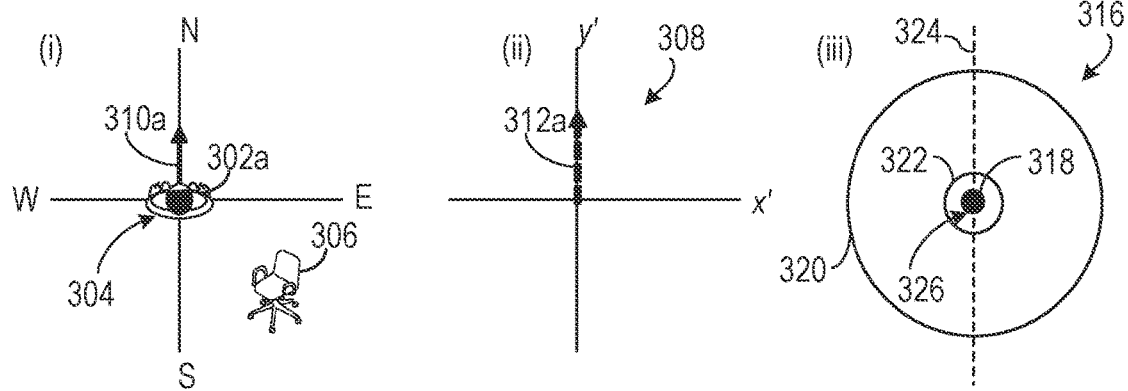
FIGS. 3A, 3B, 3C, 3D, 3E, and 3F are diagrams that illustrate examples of VR device positioning, reference frame movement, and graphical indicators.

As shown in FIG. 3A, a VR device is located at position 302a, which matches the real-world reference position 304. A real-world object 306 is also shown, illustrating that the reference position 304 is fixed through FIGS. 3A-3F. Because the magnitude of the displacement between the VR device's position 302a and the reference position 304 is zero, the speed of the reference frame 308 is zero, e.g., the reference frame 308 is not translating in the VR environment. The orientation 310a of the VR device is north, and, correspondingly, the orientation 312a of the perspective from which the VR environment is displayed is the positive y' direction, because, in this example, the real-world north direction is aligned with the reference frame's positive y'-axis.

The real-world, reference frame, and graphical indicator representations of FIGS. 3A-3F are top-down, corresponding to lateral displacements of the perspective and reference frame in the VR environment. For example, from the perspective of a user facing along the positive y'-axis in the VR environment, the positive y'-direction is straight ahead, the negative y'-direction is behind, the positive x'-direction is to the right, and the negative x'-direction is to the left.

The real-world reference position and reference orientation (e.g., reference position 304 of FIGS. 3A-3F) can be initialized upon startup of the VR device and/or initialized upon a user input. For example, the VR device can display a message "Please stand in the center of the room, spaced apart from obstacles" and, in response to a user input (e.g., a button input or a voice command), the VR device stores the VR device's current position as a reference position. Also, the VR device stores the VR device's current orientation as a reference orientation, e.g., as defining the y' axis of the reference frame, for subsequent determination of a direction of a perspective in the VR environment. For example, the reference orientation/direction can be set to match a particular direction of the reference frame, so that, whatever orientation the VR device subsequently has with respect to the reference direction, the perspective in the VR environment is set to have the same orientation with respect to the particular direction of the reference frame. In the examples of FIGS. 3A-3F, for clarity, the real-world north direction is aligned with the reference frame's positive y'-direction. After the reference position and reference orientation are set, the VR device can detect changes in its position and orientation, compared to the reference position and orientation, using sensors such as optical sensors, accelerometers, gyroscopes, etc.

Figure 3B:
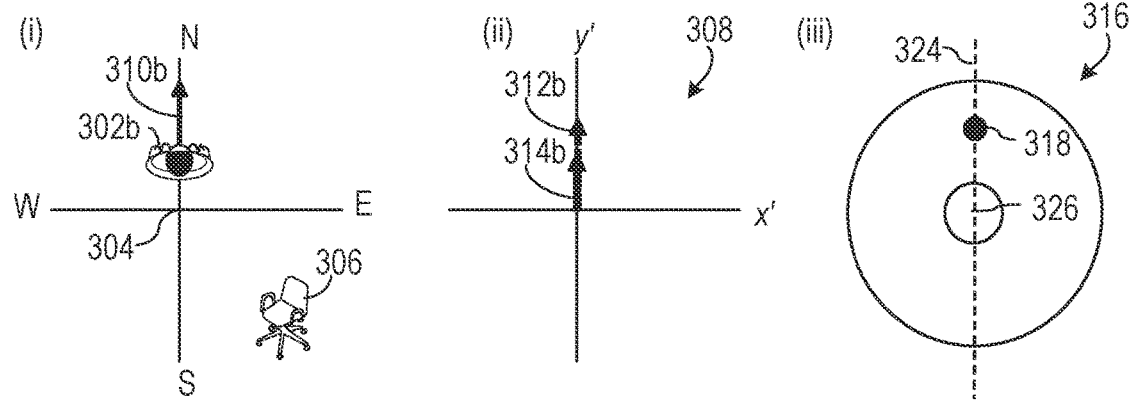

As shown in FIG. 3B, a VR device is located at position 302b, along the north-south axis. Correspondingly, the reference frame 308 has a northward velocity (314b), based on the non-zero magnitude and the direction of the displacement between position 302b and the reference position 304. In addition, based on the VR device being oriented north (310b), the perspective in the VR environment faces in the positive y' direction (312b).

Figure 3C:
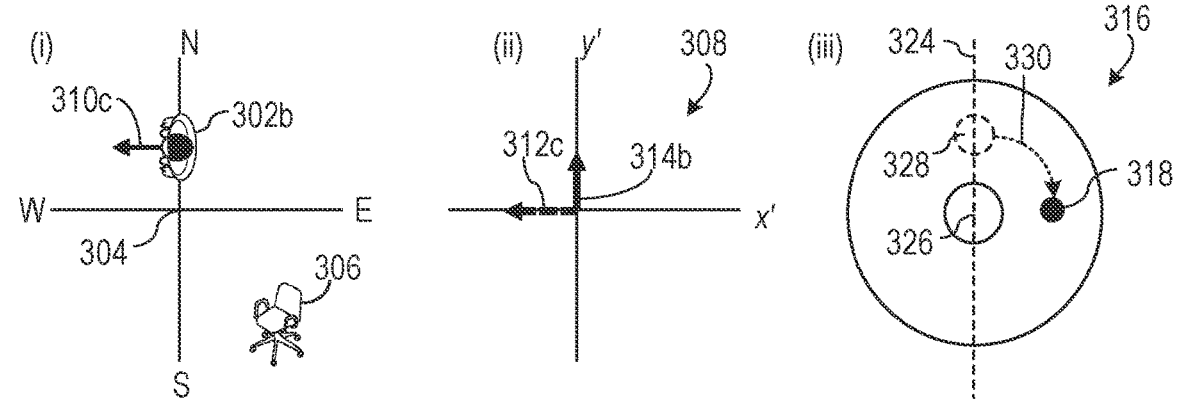

As shown in FIG. 3C, a VR device is located at the same position 302b and is oriented west (310c). Based on this, the reference frame 308 has the same northward velocity 314b as in FIG. 3B, because the change in orientation from FIG. 3B to FIG. 3C does not alter the VR device's positioning with respect to the reference position 304. However, the perspective in the VR environment faces west (312c), based on the correspondence between the orientation of the perspective and the orientation of the VR device. From a user's perspective in the VR environment, a stationary object to the user's right is moved towards the user, as the perspective moves to the right with the reference frame 308.

To allow a user to intuitively grasp this method of movement of the reference frame 308 regardless of the user's/VR device's position and orientation, a graphical indicator is constantly or near-constantly displayed to the user. The graphical indicator changes dynamically based on both the VR device's position and the VR device's orientation. As a third feature associated with some implementations of this disclosure, the graphical indicator includes a feature that indicates a direction of movement of the reference frame with respect to the current perspective, regardless of an orientation of the perspective. As the user reorients the VR device and the orientation of the perspective changes, the feature changes correspondingly (e.g., rotates) to reflect the change in orientation and to continue indicating the direction of movement of the reference frame with respect to the perspective.

In addition, as a fourth feature associated with some implementations of this disclosure, the graphical indicator includes a feature that indicates the VR device's displacement from the reference position. The feature can indicate a magnitude of the displacement (e.g., a magnitude of the lateral displacement), a direction of the displacement (e.g., a direction of the lateral displacement), or both, and can dynamically change (e.g., change positions) in response to changes in the displacement. By looking at the feature, the user can determine which direction and amount to move to return to the reference position, and/or which direction and amount to move to achieve a desired velocity of the reference frame. This feature may be the same as or a different feature from the feature that illustrates the direction of the velocity of the reference frame. For example, because the direction of the velocity of the reference frame is based on the direction of the displacement of the VR device, a single graphical feature that moves dynamically in response to both changes in VR device orientation and changes in VR device position can, suitably configured as described herein, illustrate both the velocity of the reference frame and the displacement of the VR device. In some implementations, the graphical indicator is configured so that both the VR device and the reference position are indicated by features of the graphical indicator, allowing for intuitive user repositioning.

FIGS. 3A-3F illustrate an example of a graphical indicator 316, as the graphical indicator 316 can be presented to a user based on the corresponding illustrated real-world positions 302 and orientations 310 of the VR device. The graphical indicator 316 has the same basic structure as the graphical indicator 112 of FIG. 1. The graphical indicator 316 includes a first feature 318 that both represents the position of the VR device and indicates a direction of movement of the reference frame 308. The graphical indicator 316 further includes an inner border 322 that defines a dead zone of VR device positioning (described in further detail with respect to FIGS. 5A-5B) and an outer border 320 that defines an outer zone of VR device positioning (described in further detail with respect to FIGS. 5C-5D). The inner border 322 and the outer border 320 are arranged concentrically around a central position 326 that represents the real-world reference position 304, and, accordingly, the inner border 322 and the outer border 320 can be described as indicating the real-world reference position 304. In some implementations, the graphical indicator includes a feature (e.g., a dot) having a location that directly corresponds to the real-world reference position, e.g., a feature at the central position 326. In some implementations, the graphical indicator does not include the inner border 322 and/or the outer border 320. FIGS. 3A-3F include, as a guide to the eye, a vertical line 324 that corresponds to a center orientation of the user's perspective; however, the vertical line 324 need not be included in the graphical indicator 316.

The first feature 318 represents the position 302 of the VR device with respect to the reference position 304. When the VR device is at the reference position 304, the first feature 318 is displayed at the central position 326 of the graphical indicator. As the VR device moves away from the reference position 304, the first feature 318 correspondingly moves away from the central position 326. For example, a magnitude of the displacement between the first feature 318 and the central position 326 can be proportional to the magnitude of the displacement (e.g., lateral displacement) between the position 302 of the VR device and the reference position 304.

An angular position of the first feature 318 in the graphical indicator 316 (e.g., an angle between the vertical line 324 and a line between the first feature 318 and the central position 326) is determined based on the real-world orientation of the VR device and based on the displacement between the real-world position 302 of the VR device and the reference position 304. The angular position is configured so that the direction of the first feature 318 with respect to the central position 326 matches a direction of the velocity of the reference frame 308 from the user's perspective in the VR environment. As the VR device rotates and moves, the angular position can be configured to indicate the direction of movement of the reference frame 308 with respect to the current perspective, even as the perspective changes. In addition, the angular position is configured so that a direction of the central position 326 with respect to the first feature 318 matches a direction of the reference position 304 with respect to the position 302 of the VR device, in a manner adapted to the current orientation of the VR device. These features together give rise to highly intuitive VR movement that can reduce the occurrence of VR sickness.

As shown in FIG. 3A, when the position 302a of the VR device matches the reference position 304, the first feature 318 is located at the central position 326, indicating a lack of displacement between the position 302a of the VR device and the reference position 304. In addition, based on that lack of displacement, the velocity of the reference frame 308 is zero, and the first feature 318 also indicates the zero velocity: because the first feature 318 is not pointed in any direction with respect to the central position 326, the reference frame 308 is indicated as not moving in any direction.

As shown in FIG. 3B, when the position 302b of the VR device has (i) a northward displacement with respect to the reference position 304 and (ii) a northward orientation 310b, the first feature 318 is directly above the central position 326. This arrangement illustrates, first, that the reference frame 308 is moving forward with respect to the user's perspective (direction of velocity 314b). For example, remaining stationary at position 302b, and maintaining the north-facing orientation 310b, the user would view a VR feature ahead of them moving steadily towards them at a constant velocity. In addition, this arrangement of the first feature 318 and the central position 326 illustrates that the VR device is directly forward of the reference position 304 based on the VR device's current orientation, because the first feature 318 is directly forward of the central position 326. The user may imagine themselves to be the first feature 318, facing forward along the vertical line 324: by walking or stepping backwards, the user can return to the reference position 304, and, correspondingly, the first feature 318 would return to the central position 326. The magnitude of the displacement between the first feature 318 and the central position 326 can be proportional to or otherwise change in the same direction as the magnitude of the displacement between the position 302 of the VR device and the reference position 304.

As shown in FIG. 3C, the VR device has rotated left from the configuration shown in FIG. 3B, remaining at position 302b but now facing west (310c). The reference frame 308, maintaining its previous velocity 314b based on the unchanging difference between position 302c and the reference position 304, is now moving to the user's right, from the user's perspective in the VR environment. Correspondingly, the first feature 318 rotates (330) from its prior position 328, around the central position 326, to be directly to the right of the central position 326. For example, the first feature 318 can rotate in an opposite direction to the direction of rotation of the VR device in the real world. The rotation can be continuous and dynamic, happening in real-time as the VR device rotates. At its updated position, the first feature 318 indicates, first, that the reference frame 308 is moving directly to the right with respect to the user's perspective (the perspective having the orientation 312c), because the first feature 318 points to the right by being directly to the right of the central position 326. In addition, the updated position of the first feature 318 indicates that the reference position 304 is directly to the left of the VR device, because the central position 326 is directly to the left of the first feature 318. If the user wishes to return to the reference position and stop movement of the reference frame 308, the user can simply move left until the first feature 318, correspondingly moving left, is at the central position 326. Alternatively, if the user wishes to cause the reference frame to move forward instead of to the user's right, the user can simply move forward and to the left, causing the first feature 318 to also move forward (upward) and to the left, e.g., until the first feature 318 is at the position illustrated in FIG. 3B, indicating forward movement of the reference frame. Alternatively, if the user wishes to cause the reference frame to continue moving right, but at a slower speed, the user can simply move left, which (i) intuitively represents slowing of the reference frame, because the direction of VR device movement, opposite the direction of movement of the reference frame, represents counteraction of the movement of the reference frame, and (ii) matches corresponding movement of the first feature 318 to the left to have a smaller displacement from the central position 326, corresponding to a slower speed.

This direct, matching correspondence between (i) direction of movement of the first feature 318 to achieve a desired velocity of the reference frame 308 and (ii) direction of movement of the user/VR device to achieve the desired velocity, is highly intuitive to users. In playtests of games including a graphical indicator similar to the graphical indicator 316, users have quickly grasped how to maneuver themselves in the real world to move the reference frame in a desired direction and to a desired location. Because the user's hands are not occupied with movement-controlling joysticks, the user can instead use their hands (including, in some cases, some or all fingers of their hands) to perform whatever actions are desired in the VR environment, e.g., aiming and throwing a ball, moving an object, rotating an object, etc.

In some implementations, the graphical indicator tracks the perspective during movement of the perspective, so as to remain displayed to the user during movement of the perspective. For example, the graphical indicator can be constantly or near-constantly displayed to the user during movement in the VR environment, as part of the standard interface of the VR experience. For example, the graphical indicator can be integrated into a standard HUD and/or overlaid on the VR environment, e.g., as illustrated in FIG. 1. In some implementations, the graphical indicator tracks the perspective in that the graphical indicator remains displayed in substantially the same portion/region of a VR display.

Figure 4A:
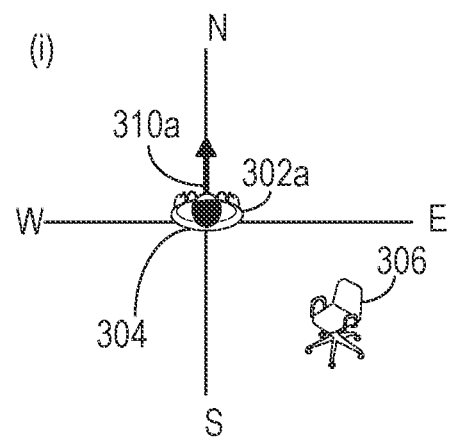
FIGS. 4A, 4B, and 4C are diagrams that illustrate examples of VR device positioning and graphical indicator rendering.
Figure 4A:
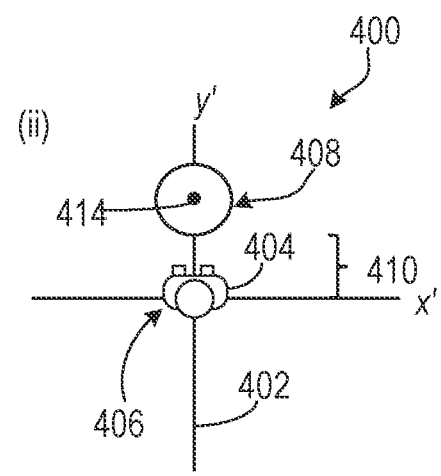
Figure 4B:
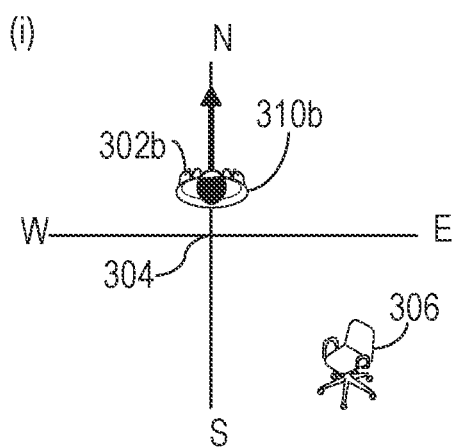
Figure 4B:
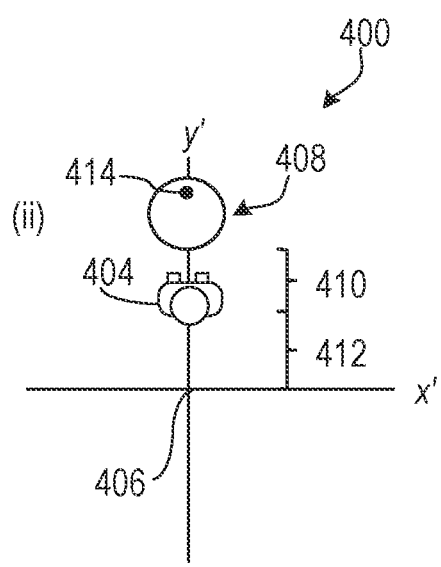
Figure 4C:
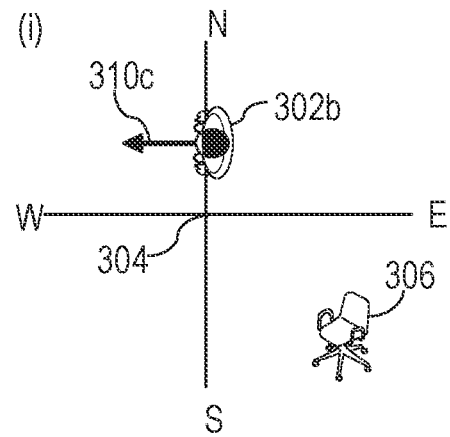
Figure 4C:
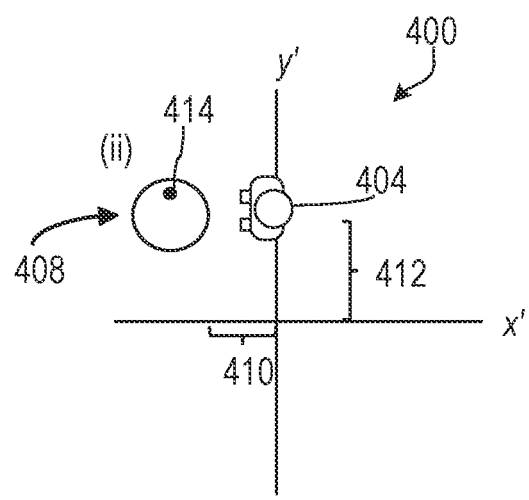

In some implementations, the graphical indicator is implemented as a rendered object, and the object can be moved to track the perspective. The VR device providing the display can change a position at which the object is rendered so that the object remains in view of the perspective, while also modifying the object to reflect changes to the VR device's position and orientation, as described throughout this disclosure. FIGS. 4A-4C illustrate examples of graphical indicator object movement and reconfiguration over a sequences of movements by a user. As shown in FIG. 4A, a VR device has position 302a (the reference position 304) and an orientation 310a facing north. In the corresponding VR environment 400 (illustrated from a top-down perspective with respect to a reference frame 402), an avatar 404 representing the user is rendered at the origin 406 of the reference frame 402. In addition, a graphical indicator object 408 is rendered a predetermined VR distance 410 from the position of the avatar 404, in the direction of the perspective, so that the user perceives the graphical indicator object 408 to be floating in front of them at the predetermined distance 410. In some implementations, the graphical indicator object 408 is rendered at a predetermined height in front of the avatar 404. In some implementations, the distance 410 is not predetermined but, rather, is variable based on one or more parameters, such as a speed of the reference frame and/or an orientation of the perspective. The graphical indicator object 408 includes a first feature 414 at its center, indicating a lack of movement of the reference frame 402 and that the VR device is at the reference position 304.

From FIG. 4A to FIG. 4B, the user moves the VR device to position 302b. For example, the user can step forward with one leg and/or lean forward. This movement causes modification of the local displacement of the perspective from the origin 406 of the reference frame 402, e.g., the perspective is shifted along the y' axis by a distance 412 with respect to the origin 406. Correspondingly, the graphical indicator object 408 is rendered an additional distance 412 along the y' axis, so as to remain the predetermined distance 410 in front of the perspective of the user at the avatar 404. The position 302b of the VR device also causes the reference frame 402 to translate in the positive y' direction, so that, in a fixed coordinate system of the VR environment 400, rendered positions of both the avatar 404 and the graphical indicator object 408 are translated in the positive y' direction. Finally, the graphical indicator object 408 is updated to reflect the altered position 302b of the VR device: the first feature 414 is rendered forward/up with respect to the center of the graphical indicator object 408, indicating that the reference frame 402 is translating forward with respect to the user's perspective.

As shown in FIG. 4C, from the configuration of FIG. 4B, the VR device is reoriented to face westward (310c). The avatar 404 and the perspective correspondingly turn to face in the negative x' direction (the local displacement of the perspective remaining unchanged), while the reference frame 402 continues translation in the positive y' direction. The graphical indicator object 408 is rendered to track the rotation of the perspective so as to remain displayed to the user at the predetermined distance 410 from the perspective's position. Moreover, the graphical indicator object 408 is updated so that, from the user's perspective, the first feature 414 points to the user's right, in the positive y' direction. This positioning indicates both that the reference frame 402 is translating to the user's right and that the reference position 304 is to the left of the VR device's current position 302b.

The graphical indicator can have various forms in different implementations, and is not limited to the specific design of the graphical indicator 316. In some implementations, the graphical indicator is a non-diegetic element of the HUD of the VR environment. For example, the graphical indicator can be superimposed over the VR environment as an overlay. In some implementations, the graphical indicator is partially transparent so that features of the VR environment behind the graphical indicator can be viewed. In some implementations, the graphical indicator is integrated into the VR environment. For example, the graphical indicator can be displayed on the inside of a helmet worn by the user's avatar or displayed on a drone that hovers in front of the user's avatar. The graphical indicator can include various suitable combinations of shapes and animations to provide the indications described herein, such as indicating the direction of movement of the reference frame and/or indicating the VR device's position with respect to the reference position. The examples of first features illustrated herein are circular markers; other marker types are also within the scope of this disclosure, e.g., arrows, stars, or other shapes.

In some implementations, the graphical indicator is displayed at a tilted/pitched angle with respect to the user's perspective. For example, the graphical indicators 316 of FIGS. 3A-3F are illustrated with a 0° pitch angle, while the graphical indicator 112 of FIG. 1 is pitched forward at a non-zero pitch angle. When the graphical indicator is pitched forward, the "up" direction of an un-pitched graphical indicator can be oriented in a substantially forward direction from the user's perspective, such that, for example, a forward-oriented first feature indicates forward translation of the reference frame. In some implementations, the pitch angle can be determined based on a VR experience state and/or a user's position. For example, in some implementations, the pitch angle is based on a speed of the perspective and/or the reference frame in the VR environment, e.g., increases with increasing speed of the perspective and/or the reference frame. In some implementations, the pitch angle is based on a vertical position of the VR device, e.g., such that a lower vertical position (e.g., corresponding to the user crouching) results in a more-pitched graphical indicator. Other visual characteristics of the graphical indicator may additionally or instead depend on the speed, the vertical position, and/or other parameters. For example, a color of one or more features of the graphical indicator may change based on the speed and/or the vertical position.

In some cases, the effects, for user experience, of having the graphical indicator track the perspective in the VR environment, so as to remain normally displayed during gameplay/environment-traversal, may be different from the effects of having the graphical indicator merely available to the user without tracking the perspective. In the absence of the graphical indicator tracking the perspective, a graphical indicator may be rendered at a predetermined position in the VR environment with respect to the reference frame (as opposed to with respect to the perspective). For example, a graphical indicator may be rendered below the user's avatar on a ground surface of the VR environment, such that the user looks down to view the graphical indicator and, when looking laterally or upwards, does not view the graphical indicator or views only an incomplete portion of the graphical indicator. When this or other alternative graphical indicator presentation methods are used, a user's mind may fail to fully internalize how the graphical indicator is connected to both reference frame movement and real-world positioning. This can result in inconsistent and clumsy movement by the user. Moreover, playtests have shown that the graphical indicators described herein are interpreted by users as a bridge between real-world movement and movement in the VR environment. Without the visual feedback of the graphical indicator in view, the user may experience increased VR sickness, even if the graphical indicator is available to the user (but does not track the user's perspective), e.g., by looking down.

In some implementations, although the graphical indicator tracks the perspective in the VR environment so as to remain normally displayed during navigation, the graphical indicator need not always be displayed, without exception. Rather, the graphical indicator can be not displayed during some portions of the VR experience, such as during cutscenes, when the user enters a menu, and/or during gameplay types besides traversal of the VR environment. For example, the graphical indicator object can be not displayed to the user during these and/or other portions of the VR experience, without departing from the scope of this disclosure.

Figure 3D:
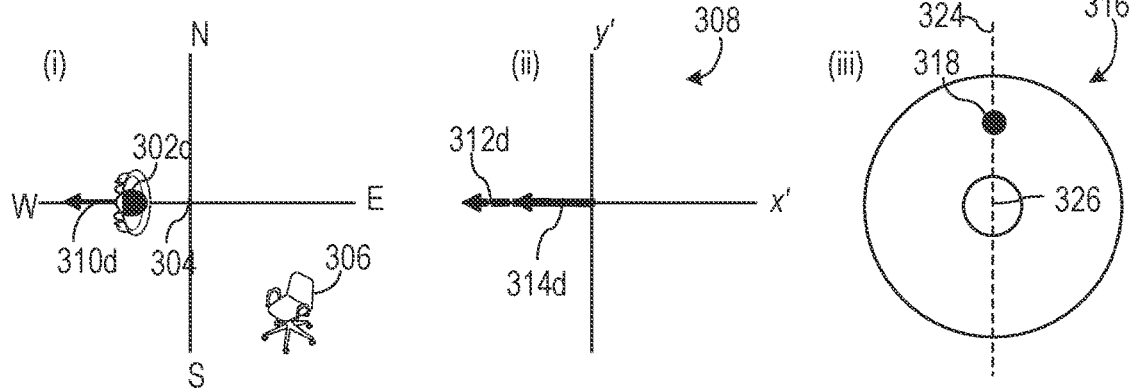
Figure 3E:
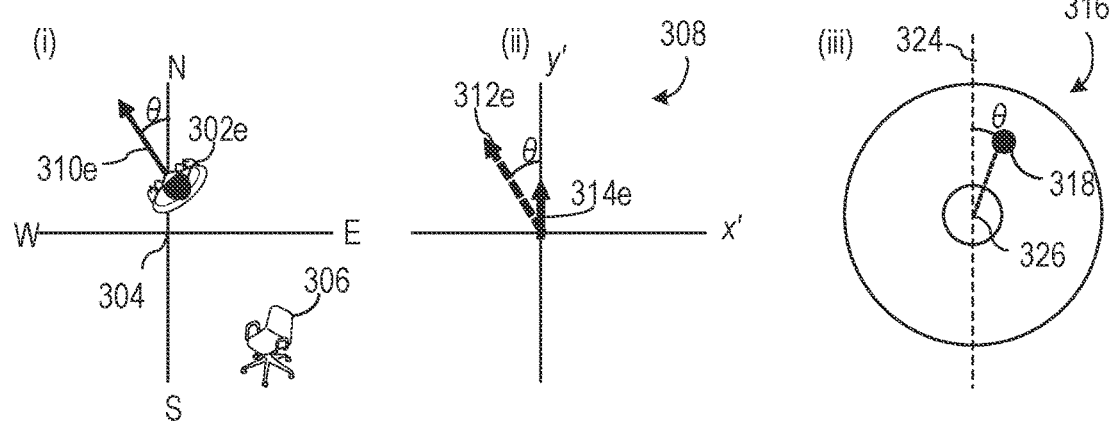
Figure 3F:
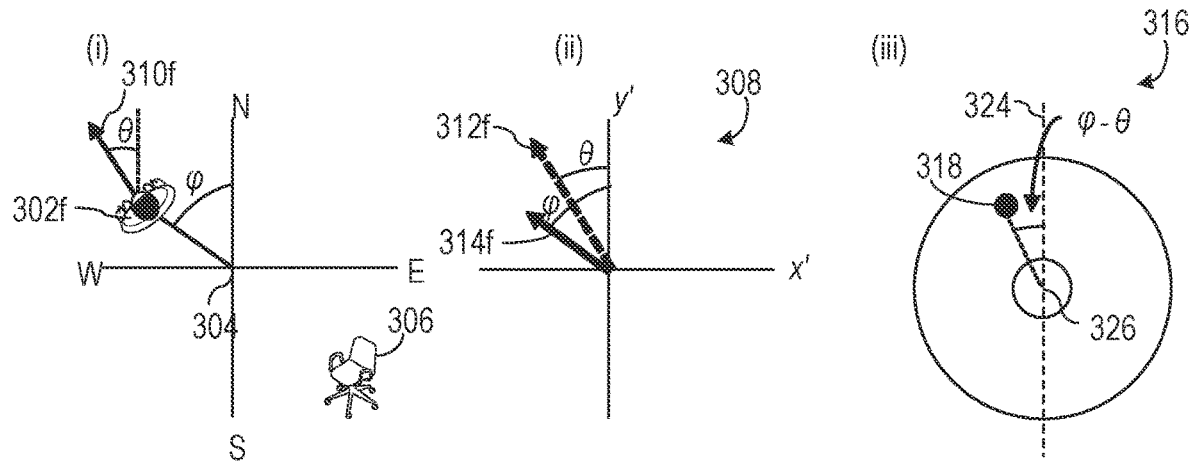

FIGS. 3D-3F illustrate several further examples of (i) VR device positioning and VR device orientation, (ii) corresponding reference frame movement and corresponding perspective orientation, and (iii) corresponding graphical indicators. As shown in FIG. 3D, the VR device is positioned west of the reference position 304 (302d) and faces west. Accordingly, the perspective faces along the negative x' axis (312d) and the reference frame 308 translates along the negative x' axis (314d). Even though the underlying real-world positions and orientations are different, the graphical indicator 316 corresponding to this configuration is the same as the graphical indicator 316 corresponding to the configuration illustrated in FIG. 3B (assuming that the distance between position 302d and the reference position 304 is the same as the distance between position 302b and the reference position 304): in both situations, the reference frame 308 is translating straight ahead from the user's perspective, and, in both situations, the reference position 304 is directly behind the VR device.

As shown in FIG. 3E, the VR device is positioned north of the reference position 304 (302e) and is oriented at an angle −θ with respect to north (310e). Correspondingly, the orientation 312e of the perspective is −θ with respect to the positive y' axis, and the reference frame 308 translates in the positive y' direction (314e). Moreover, the first feature 318 has an angle θ with the vertical line 324, indicating that the reference frame 308 is translating diagonally forward and to the right, from the user's perspective, at an angle θ. In addition, the central position 326 of the graphical indicator is rendered at a direction with respect to the first feature 318 that matches a direction of the reference position 304 with respect to the position 302e of the VR device, given the orientation 310e of the VR device. The positioning of the first feature 318 also indicates that the user can move back and to the left to return the VR device to the reference position 304 or, equivalently, that the user can rotate rightward (causing rotation of the first feature 318 in the opposite direction, counter-clockwise) until the first feature 318 is aligned with the vertical line 324, and then move backward, to return the VR device to the reference position 304.

As shown in FIG. 3F, the VR device is positioned northwest of the reference position 304 at an angle −φ (302f) and is oriented at an angle −θ with respect to north (310f). Correspondingly, the orientation 312f of the perspective is −θ with respect to the positive y' axis, and the reference frame 308 translates at the angle −φ with respect to the positive y' axis. To provide the user with an intuitive understanding of this state, the first feature 318 is positioned at an angle φ-θ with respect to the vertical line 324, indicating that, from the user's perspective, the reference frame is translating diagonally forward and to the left at the angle φ-θ.

Figure 5A:
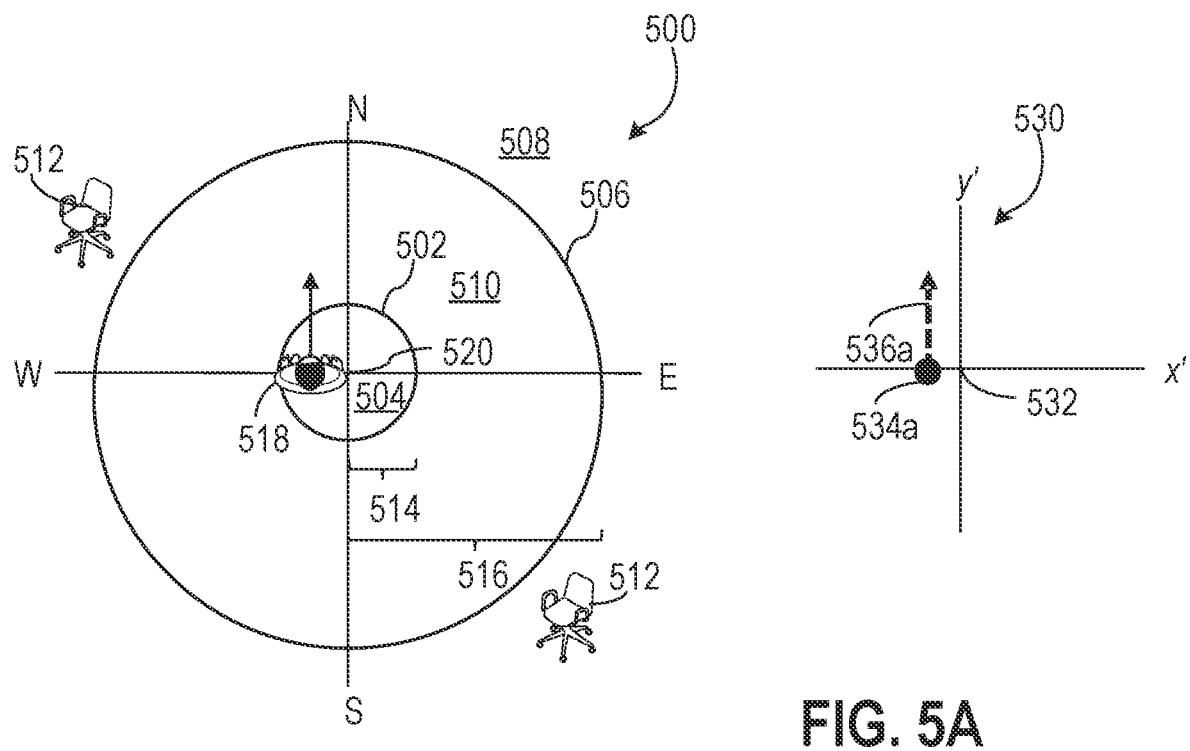
FIGS. 5A and 5B are diagrams that illustrate examples of VR device positioning, perspective configuration, and a corresponding graphical indicator.

FIGS. 5A-5D illustrate examples of a dead zone and an outer zone that can be used to determine reference frame velocity. As shown in FIG. 5A, a real-world environment 500 includes, within an inner boundary 502, a dead zone 504. The real-world environment 500 further includes, outside an outer boundary 506, an outer zone 508. Between the dead zone 504 and the outer zone 508 is a movement zone 510. In some implementations, the outer boundary 506 is defined (by the user or automatically by the VR device) to avoid environmental obstacles 512, such as walls or furniture. Accordingly, the dead zone 504 and the movement zone 510 together can constitute a safe area for user movement, while user movement outside the dead zone 504 and the movement zone 510 may be hazardous.

In some implementations, movement of the VR device 518 within the dead zone 504 (e.g., when the magnitude of the difference between the position of the VR device 518 and a reference position 520 is less than a radius 514 of the dead zone 504) does not result in movement of the reference frame 530. This can allow for small user movements around the reference position 520 that do result in variations in the local displacement of the perspective from the reference frame origin 532 but that do not cause reference frame movement. For example, the VR device 518 can move within the dead zone 504 to perform projectile dodging or to lean/peak around obstacles and cover in the VR environment, providing an intuitive VR experience.

Figure 5B:
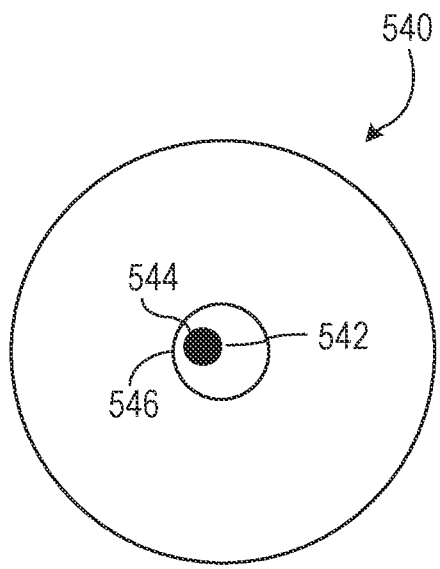

Based on the configuration of the VR device 518 in FIG. 5A, the velocity of the reference frame 530 is zero, and the perspective is displaced from the origin 532 of the reference frame 530, at position 534*a* and facing in the positive y' direction (536*a*). A corresponding graphical indicator 540, as shown in FIG. 5B, includes a first feature 544 displaced from a central position 542 but within an inner border 546. The inner border 546 of the graphical indicator 540 represents the inner boundary 502 in the real world: as the VR device 518 approaches the inner boundary 502, the first feature 544 approaches the inner border 546, and, when the VR device 518 is far enough from the reference position 520 to be on the inner boundary 502, the first feature 544 is rendered on the inner border 546. Although the first feature 544 is displaced from the central position 542, the first feature 544 is not indicating a particular direction of the velocity of the reference frame 530; rather, the first feature 544, by being inside the inner border 546, is indicating that the velocity is zero. The first feature 544 also indicates the direction and amount of displacement of the VR device 518 from the reference position, as described above.

Other shapes and configurations of the dead zone (sometimes referred to as an "inner zone") are also within the scope of this disclosure. In some implementations, the dead zone is absent. In some implementations, VR device displacement within the inner zone causes nonzero reference frame speed, and a function for the speed, as a function of the magnitude of the displacement for VR device movement within the inner zone, is different from a function for the speed, as a function of the magnitude of the displacement for VR device displacement within the movement zone. For example, the speed can scale more slowly within the inner zone than within the movement zone. In some implementations, instead of being rotationally symmetric about the reference position, the inner zone can have another shape. For example, the inner zone can be an ellipse or can be a cross-shaped zone that extends along both forward-back and lateral axes (e.g., north-south and east-west axes) of the real world with a predetermined width.

Within the movement zone 510, the speed of the reference frame 530 is a function of the magnitude of the displacement between the VR device 518 and the reference position 520. For example, in some implementations, the speed of the reference frame 530 is proportional to the magnitude of the displacement, or otherwise a function of the magnitude of the displacement such that, over some or all of the movement zone 510, the speed increases monotonically with increasing magnitude of the displacement. Other suitable functions, such as a scaled exponential function, a parabolic function, or a combination of these and/or other functions, are also within the scope of this disclosure. In some implementations, the speed of the reference frame 530 is configured so that the speed increases continuously from zero as the VR device 518 moves from the dead zone 504 to the movement zone 510. For example, a simple linear speed function $s = a \cdot r$, where a is a constant and r is the magnitude of the displacement (e.g., lateral north/south/east/west displacement) between the VR device 518 and the reference position 520, would result in a discontinuous reference frame speed as r goes from $<r_1$ to $>r_1$, where $r_1$ is the radius 514 of the dead zone 504. Instead, the speed function can be, for example, $s = a \cdot (r - r_1)$.

As is suggested by the foregoing description, in some implementations, translation of the reference frame can be decomposed into two speeds in two orthogonal directions, and the two speeds are based on displacement of the VR device in two corresponding orthogonal directions. For example, in the example of FIG. 5A, a speed of the reference frame 530 along the y' axis can be based on a displacement of the VR device 518 along the north-south axis, and a speed of the reference frame 530 along the x' axis can be based on a displacement of the VR device 518 along the east-west axis. For example, the speed of the reference frame 530 along the y' axis can be independent of the displacement of the VR device 518 along the east-west axis, and the speed of the reference frame 530 along the x' axis can be independent of the displacement of the VR device 518 along the north-south axis (in some implementations, except insofar as the displacements determine whether the VR device 518 is in the dead zone 504).

Figure 5C:
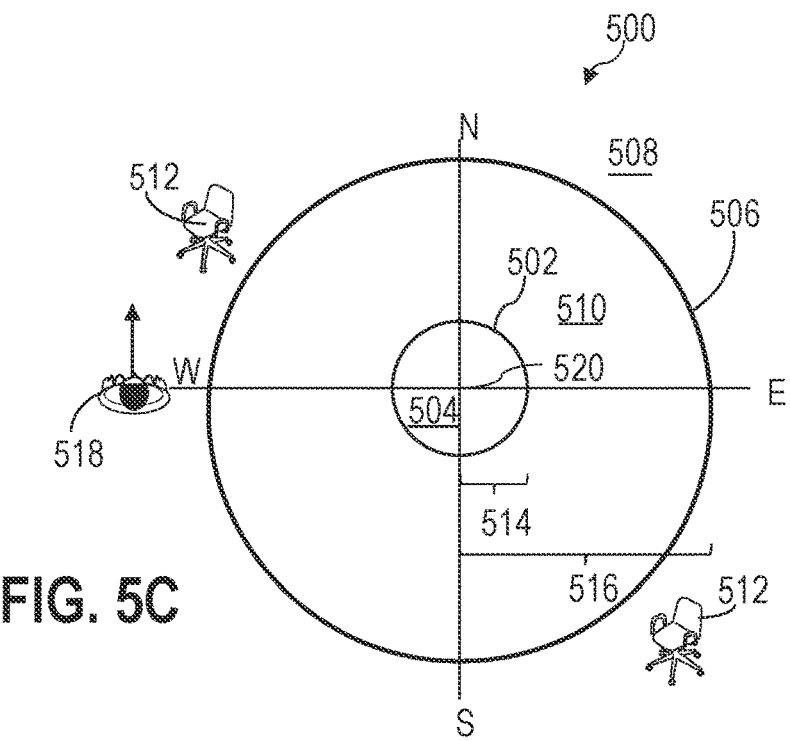
FIGS. 5C and 5D are diagrams that illustrate examples of VR device positioning and a corresponding VR display.
Figure 5D:
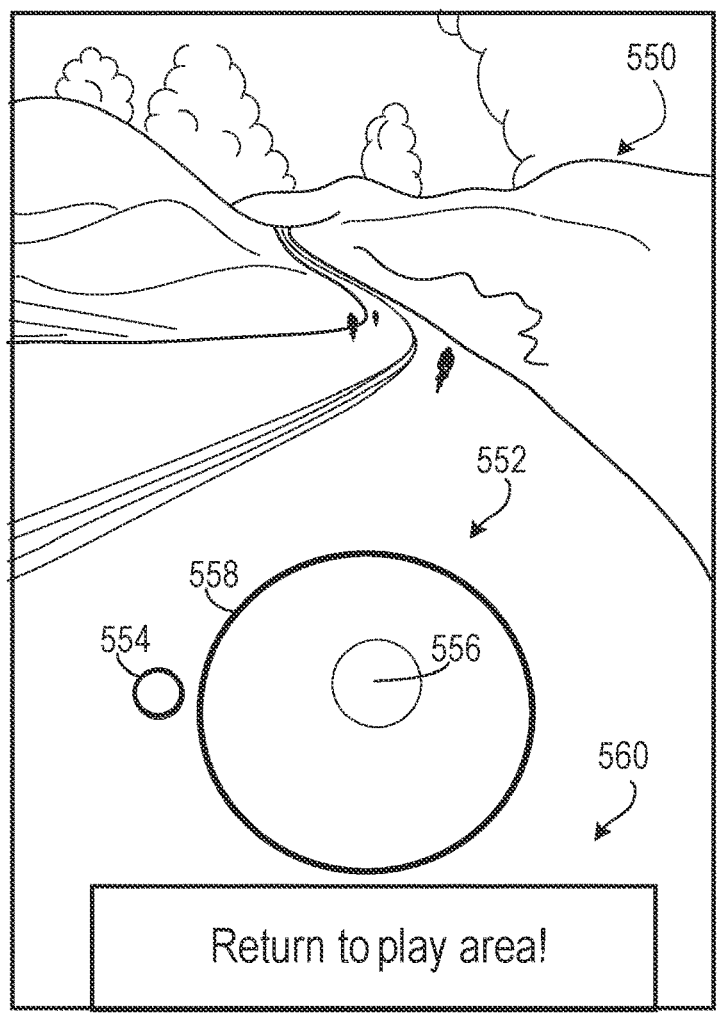

In implementations that include an outer zone 508, the velocity of the reference frame and/or the display provided to the user can be based on the VR device 518 being in the outer zone 508. Because the outer zone 508, in some implementations, represents a safety hazard, it can be beneficial to disincentive the user from passing into the outer zone 508. As shown in FIGS. 5C-5D, the VR device 518 is positioned in the outer zone 508, west of the reference position 520 and facing north. In a corresponding VR display 550, a graphical indicator 552 includes a first feature 554 positioned to the left of the central position 556 and outside an outer border 558, indicating (i) that the reference position 520 is to the right of the VR device 518, and (ii) that the VR device 518 is in the outer zone 508. Based on this positioning, the VR display 550 can include one or more warning indicators to notify the user that the VR device is in the outer zone 508. For example, a warning indicator 560 instructs the user to return to the play area (e.g., the movement zone 510 and the dead zone 504). The graphical indicator 552 can be pitched forward such that the upper position of the graphical indicator 552 is pointed forward in the user's perspective. In some implementations, instead of being rotationally symmetric about the reference position, the outer zone can have another shape. For example, the outer zone can be an ellipse, a rectangle/square, or another shape.

Other suitable warning indicators are also within the scope of this disclosure. For example, the VR display can turn a solid color (e.g., black), can render a boundary (e.g., a wall) in the VR environment to represent the border of the outer zone 508, and/or can render the user's real-world environment (as captured by a camera of the VR device) to assist the user in avoiding hazards. In some implementations, the velocity of the reference frame can be adjusted based on the VR device 518 being in the outer zone 508. For example, the speed of the reference frame can be decreased progressively as the displacement of the VR device 518 from the reference position 520 increases in the outer zone 508. The speed of the reference frame when the VR device 518 is in the outer zone 508 can less than a speed corresponding to when the VR device 518 is near the outer boundary 506 but within the movement zone 510. In some implementations, the speed of the reference frame is set to zero or a constant low speed when the VR device 518 is in the outer zone 508.

Other types of zone(s) can be included instead of, or in addition to, the types of zones described explicitly here. Each zone can be associated with a different corresponding relationship between a velocity of the reference frame and a position of the VR device in the zone. Each zone can correspond to a feature, such as a border, in the graphical indicator to indicate to a user the position of the VR device with respect to the zone.

Parameters of VR device movement and reference frame control can be configured in a variety of ways to facilitate a variety of different movement types. Users can bend, lean, step, and/or walk to move the reference frame and adjust the perspective's local displacement and orientation. Some implementations facilitate user foot movement, such as stepping and/or walking, as part of this control. In some implementations, the outer boundary has a radius that facilitates a large step by the user, from the reference position, plus the user leaning forward from the stepped-forward position. For example, for a range of VR device displacements (e.g., lateral displacements) up to at least a threshold value (not necessarily starting from zero displacement), the speed of the reference frame is a continuous function of the magnitude of the displacement. For example, the threshold value can be between two feet and four feet, such as between 2.5 feet and four feet or between three feet and four feet. In some implementations, the threshold value is between 2.5 feet and six feet, such as between 2.5 feet and five feet or between three feet and six feet. In some implementations, the threshold value lies in another range defined by any two of the foregoing values. In some implementations, over the range of VR device displacements up to the threshold value, the reference frame moves smoothly in the VR environment, e.g., without teleporting between separate positions. In some implementations, the threshold value is the radius of the outer boundary that defines the start of the outer zone.

In some cases, these threshold values can facilitate user movement that provides a more intuitive and enjoyable user experience. In some examples of user movement, from the reference position, the user can step with one foot in the desired direction of reference frame movement, correspondingly moving the VR device (e.g., a headset) in that direction. The user pivots around their other foot at approximately the reference position. To move the reference frame faster, the user leans towards their outer foot (by increasing the magnitude of the displacement between the VR device and the reference position). To move the reference frame slower, the user leans towards their center foot. If even faster speed is desired, the user can move their center foot, taking step(s) outward from the reference position. Accordingly, continuous reference frame movement can be provided for relatively large user movements without breaking the fidelity of the VR experience, e.g., without introducing teleportation. This continuous reference frame movement can be further facilitated by the graphical indicators described herein, e.g., a graphical indicator that tracks the perspective so as to remain displayed to the user. By contrast, in some VR movement schemes based primarily or entirely on leaning/bending, without significant foot movement, teleportation of the reference frame can be performed based on relatively small VR device displacements, e.g., less than two feet or less than 2.5 feet. Such teleportation-based movement control may feel incongruous to the user; however, in some cases, in the absence of a graphical indicator as described herein, continuous reference frame movement for larger displacements may itself feel unintuitive and/or promote VR sickness.

The foregoing description generally describes reference frame movement as translation in two dimensions. However, a VR device may be moved not only laterally but also vertically, further from and closer to the ground. In addition, VR environments themselves may include slopes, bumps, and other non-planar ground surfaces that the user's avatar traverses. At least to account for such situations and provide realistic-feeling VR movement, in some implementations, the reference frame velocity is based on the VR device displacement (e.g., lateral displacement) and, in addition, one or more modifiers. For example, a slope-based modifier can cause the speed of the reference frame to be decreased based on the avatar moving uphill and/or increased based on the avatar moving downhill. The direction of reference frame movement, as projected onto a horizontal plane of the VR environment, can be based on lateral (e.g., north/south/east/west) displacements of the VR device, as described throughout this disclosure, while the absolute direction of the reference frame movement can be based on the local topology of the VR environment, e.g., the reference frame can follow a ground surface of the VR environment. In some implementations, if the movement of the reference frame causes the avatar to impact a surface in the VR environment (e.g., an obstacle or wall), the velocity of the reference frame is adjusted. For example, the velocity can be reduced gradually to decrease a magnitude of reference frame acceleration as the reference frame is stopped by the surface, providing a "shock absorber" effect. In some implementations, the velocity can be adjusted to stop the avatar from passing through the surface. For example, the reference frame can be translated along the surface instead of passing through the surface as would be suggested by the direction of the displacement of the VR device. For example, a velocity component into the surface can be set to zero, while a velocity component along the surface can remain. In some implementations, a speed of the reference frame is based on a vertical position of the VR device. For example, a lower VR device (e.g., corresponding to the user crouching) can cause the speed to be increased from the speed's value based only on the magnitude of the displacement of the VR device.

Other and/or additional modifiers can be used to determine reference frame speed. For example, the reference frame speed can be increased or decreased based on a state of the VR experience, e.g., a game state of a VR game. For example, the user's avatar can pick up a speed-boost item that increases the speed. As another example, the user's avatar can have an energy level that can be expended to increase the speed. For example, the energy level can increase when the user is standing (corresponding to a VR device height at or near a reference height) and can decrease, increasing the speed, when the user is crouching.

Figure 6A:
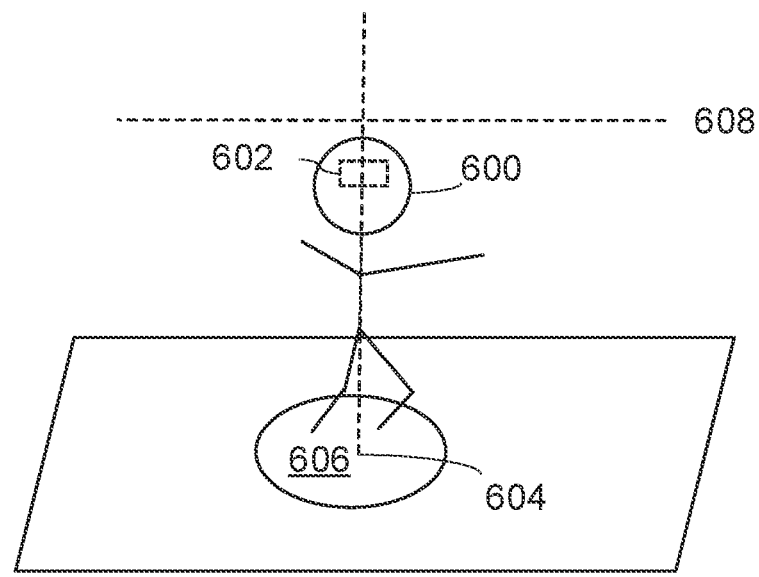
FIGS. 6A, 6B, 6C, 6D, 6E, and 6F are diagrams that illustrate examples of VR device positioning, associated user movement, and corresponding VR displays.
Figure 6B:
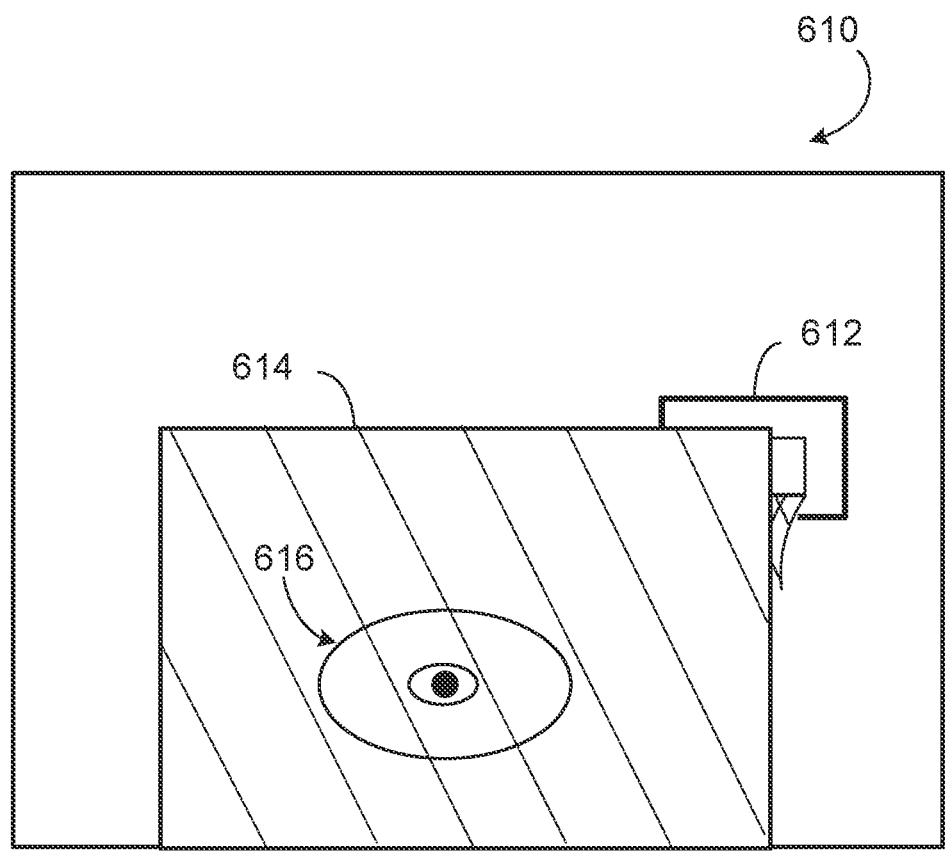

FIGS. 6A-6F illustrate examples of user movement and corresponding VR displays. As shown in FIG. 6A, a user 600 wears a VR headset 602. The VR headset 602 is positioned at a reference position 604 in a dead zone 606. The VR headset 602 is positioned slightly below a reference height 608. In a corresponding VR display 610, as shown in FIG. 6B, the perspective's view of a target 612 is blocked by an obstacle 614, making it difficult for the user to throw a virtual ball into the target 612. A graphical indicator 616 indicates that the VR headset 602 is positioned within the dead zone 606 at the reference position 604.

Figure 6C:
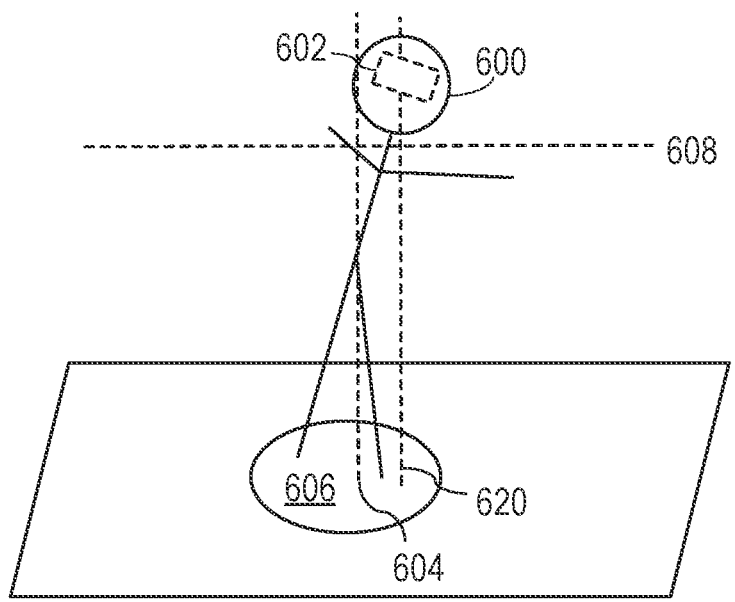
Figure 6D:
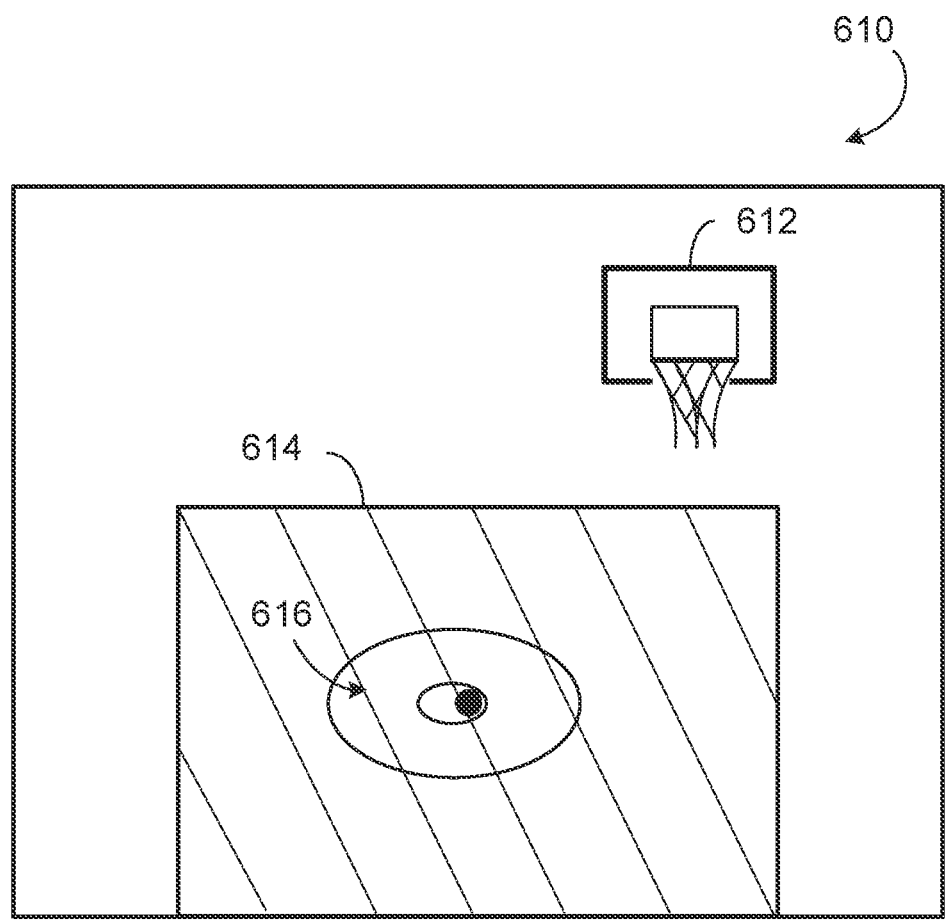

As shown in FIG. 6C, the user 600 leans to one side, displacing the VR headset 602 to a lateral position 620 within the dead zone 606. In addition, the user 600 stands more upright, raising the VR headset 602 above the reference height 608. Because the VR headset 602 is laterally within the dead zone 606, the reference frame does not move. However, the movements of the VR headset 602 cause changes in the local displacement of the perspective relative to the reference frame. In the corresponding VR display 610 shown in FIG. 6D, the perspective is raised above the obstacle 614, such that the target 612 is fully visible and shifted slightly left due to the local change in the perspective. The graphical indicator 616, following the movement of the perspective, remains displayed to the user in substantially the same position as it was previously displayed. The graphical indicator 616 indicates that the VR headset 602 is displaced to the right of the reference position 604 without causing reference frame movement.

Figure 6E:
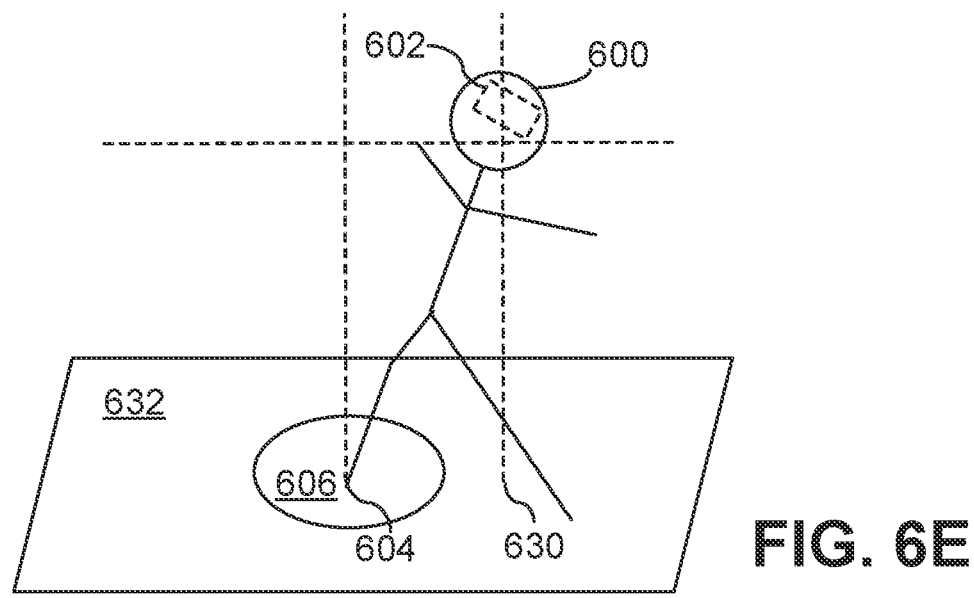
Figure 6F:
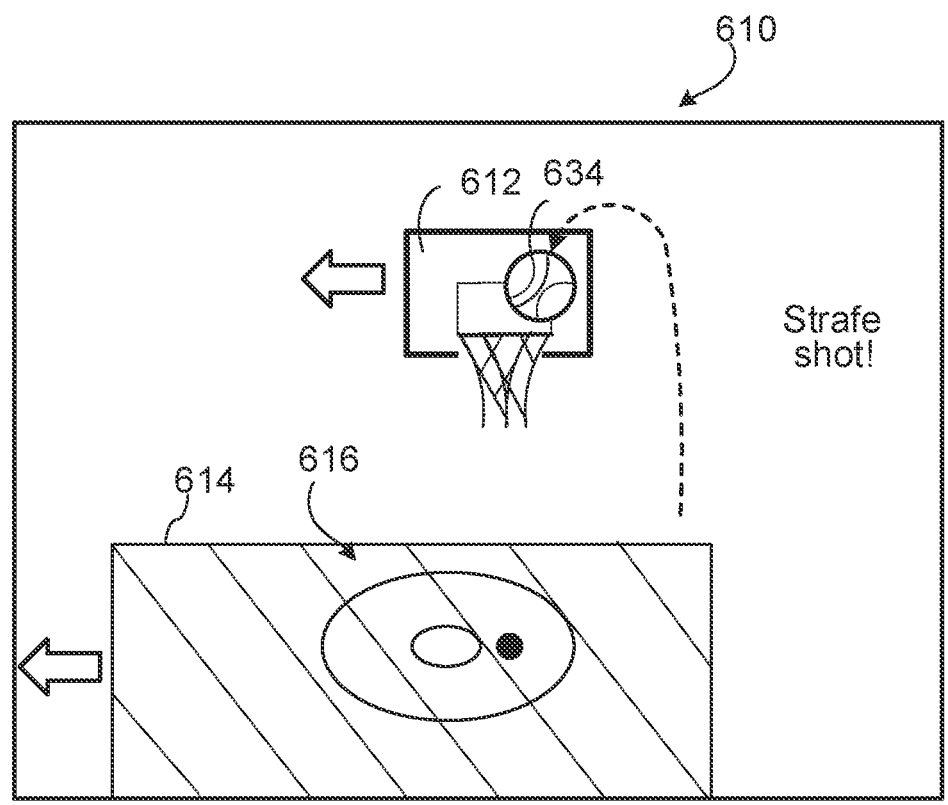

As shown in FIG. 6E, the user 600, generally pivoting about one foot, steps to one side with their other foot, moving the VR headset 602 to a lateral position 630 that is within a movement zone 632, outside the dead zone 606. In the corresponding VR display 610, as shown in FIG. 6F, the graphical indicator 616 indicates that the reference frame is translating to the right with respect to the user's perspective. Accordingly, the target 612 and the obstacle 614 are observed to shift left. Because of the positioning-controlled movement of the reference frame, the user's hands are free to manipulate a VR ball 634 and throw the VR ball 634 into the target 612 as a "strafe shot," in reference to the perspective's strafing motion relative to the target 612.

Figure 7:
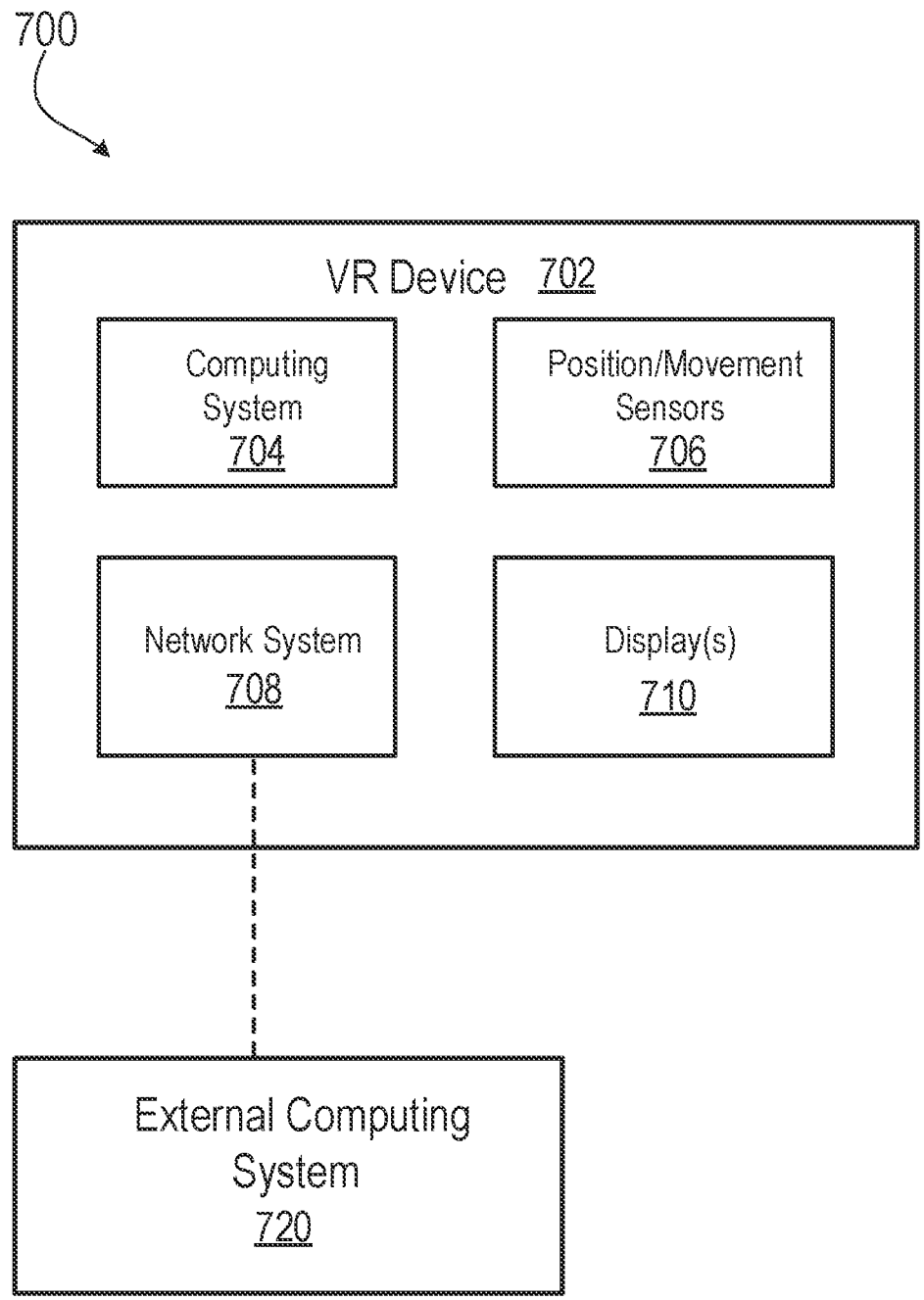
FIG. 7 is a diagram illustrating an example of a system including a VR device and an external computing system.

Processes according to this disclosure can be performed by VR devices, devices external to VR devices, or combinations thereof. FIG. 7 illustrates an example of a system 700 including a VR device 702. The VR device 702 can be, for example, a head-mounted display (HMD), such as a VR headset or smartglasses. In some implementations, the VR device 702 is configured to be worn by a user and to provide a VR display to the user. For example, the VR device 702 can include straps, cushions, and a frame so that the user can wear the VR device 702.

The VR device 702 includes a computing system 704, position/movement sensors 706, a network system 708, and display(s) 710. Some examples of VR devices can include additional elements and/or not include one or more of these elements. The computing system 704 can include one or more processors and one or more computer storage media (non-transitory media) storing instructions that, when executed by the one or more processors, cause the one or more processors to perform operations. The position/movement sensors 706 are configured to allow the VR device to sense VR device movement with respect to a reference position. For example, the position/movement sensors 706 can include 6DoF (six degree of freedom) sensors that allow for VR device tracking along real-world x, y, and z axes, as well as rotationally, to determine the orientation of the VR device and the displacement between the VR device and the reference position. In some implementations, the position/movement sensors 706 include one or more accelerometers, magnetometers, and/or gyroscopes, e.g., in an inertial measurement unit (IMU). In some implementations, the position/movement sensors 706 include one or more cameras, and the VR device 702 can determine position and/or orientation of the VR device 702 by analyzing images captured by the cameras, e.g., using a simultaneous localization and mapping (SLAM) process.

The computing system 704 can receive data from the position/movement sensors 706 and, based on the data, render a VR environment and other VR elements for display to the user using one or more displays 710 of the VR device 702. The displays 710 can include a single screen or multiple screens, e.g., one screen for each eye. The displays 710 can include any suitable display type, such as OLED display or LCD display.

The network system 708 is configured to exchange data with one or more external devices. For example, in some implementations, the network system 708 exchanges data with one or more wireless controllers that can be manipulated by the user to control actions in the VR environment. In some implementations, the network system 708 exchanges data with an external computing system 720, such as a computing system local to the VR device 702 (e.g., a desktop computer or a gaming console) or a remote computing system, such as a cloud computing system. In some implementations, at least a portion of computer processing associated with VR rendering is performed by the external computing system 720. The network system 708 can use one or more network communication types, e.g., wired communication, Bluetooth network communication, cellular network communication, Wi-Fi communication, etc.

The foregoing description describes reference frame velocity control based on VR device positioning. In some implementations, instead of VR device positioning, the reference frame velocity is controlled by user positioning, e.g., by positioning of a head of the user. When the VR device is a VR headset worn on the user's head, the user experience in the two situations is nearly identical. However, reference frame velocity control by user positioning can be performed without VR device-integrated sensor(s) to detect VR device position. For example, in some implementations, a user can wear a VR headset that displays a VR experience but that does not include sensors to detect VR device positioning. Instead, separate sensor(s), such as mounted cameras (e.g., with depth detection) can be used to determine the position and orientation of the user's head, and the reference frame and perspective orientation can be determined based on displacement between the user's head and a reference position. Such a configuration can be applied for any of the implementations and examples described herein, with "displacement/orientation of the VR device" being replaced with "displacement/orientation of the head of the user" or another portion of the user.

FIG. 8 illustrates an example of a process 800 according to some implementations of the present disclosure. The process 800 can be performed, for example, by a VR and/or AR headset (e.g., using an IMU and/or other sensor of the headset), by a computer-implemented system (e.g., including one or more computers and one or more computer memory devices), and/or by one or more other devices and/or systems.

In the process 800, a VR device displays a VR environment (802). The VR environment is presented from a perspective in the VR environment that is defined with respect to a reference frame in the VR environment. The VR device displays a graphical indicator of a current real-world position of the VR device with respect to a real-world reference position. The graphical indicator tracks the perspective during movement of the perspective to remain displayed during the movement of the perspective.

For example, the graphical indicator can include a feature that indicates a direction of a velocity of the reference frame with respect to an orientation of the perspective, where the feature moves based on changes in the orientation of the perspective, such that the feature indicates the direction of the velocity independent of the changes in the orientation of the perspective. For example, an orientation of the reference frame can be independent of a real-world orientation of the VR device. For example, the perspective in the VR environment can be based on a position of the reference frame, a local displacement with respect to the reference frame, and an orientation of the perspective with respect to the reference frame.

For example, the graphical indicator can include a first graphical feature indicating the current real-world position of the VR device, and a second graphical feature indicating the real-world reference position.

The process 800 including determining a velocity of the reference frame based on a displacement between the current real-world position and the real-world reference position (804). For example, a speed of the velocity can be based on a magnitude of the displacement (e.g., to increase with increasing magnitude). For example, a direction of the velocity with respect to a fixed coordinate system of the VR environment can be independent of a real-world orientation of the VR device.

The process 800 includes translating the reference frame in the VR environment at the velocity (806).

The process 800 can include features and have characteristics as discussed with respect to FIGS. 1-7 and throughout this specification. Moreover, some aspects of this disclosure describe a modification of the process 800 in which the "current real-world position of the VR device" is replaced by the "current real-world position of a portion of the user," e.g., where that position can be determined by a sensor that need not be included in a VR headset.

The process 800, and associated processes and features described in this specification, can provide solutions to problems specific to virtual-reality motion and control. As discussed above, virtual reality sickness is linked to mismatches between simulated motion and physically-perceived motion. However, the features discussed herein— such as the presence/display of the graphical indicator, specific feature(s) of the graphical indicator, relationships between reference frame movement/orientation and real-world position/orientation, and/or relationships between dynamic control of the graphical indicator and real-world position/orientation—can reduce or eliminate occurrence of VR sickness, for example, by providing an intuitive bridge between real-world movement and movement in the VR environment. In addition, or alternatively, these features can provide benefits besides VR sickness reduction, such as intuitive and realistic-feeling VR movement/control, e.g., with a user made intuitively aware of the user's position, and/or with VR movement made continuous over a wider range of movement, as opposed to only teleportation-based.

As such, at least some of the processes discussed herein can provide a specific manner of displaying and/or controlling a VR environment and/or a graphical indicator, the specific manner providing specific improvements over prior systems that perform VR control and/or display differently, resulting in an improved VR experience for users (e.g., with reduced occurrence of VR sickness and/or more intuitive VR control). These improvements can be specific to VR/AR devices and user experience of such devices, overcoming problems specifically arising in the realm of VR/AR devices.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, a data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures. The apparatus and the computer-readable storage devices can be included in a computing system such as 704 and/or 720.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and a processing apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

A few embodiments have been described in detail above, and various modifications are possible. The disclosed subject matter, including the functional operations described in this specification, can be implemented in electronic circuitry, computer hardware, firmware, or in combinations of them, such as the structural means disclosed in this specification and structural equivalents thereof.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A virtual reality (VR) control method, comprising:
displaying, by a head-mounted VR device,
a VR environment, the VR environment presented from a first-person perspective in the VR environment that is defined with respect to a reference frame in the VR environment, and
a graphical indicator of a current real-world position of the head-mounted VR device with respect to a real-world reference position, wherein the graphical indicator is included in a heads-up display (HUD) displayed by the head-mounted VR device, and
wherein the graphical indicator tracks the perspective during movement of the perspective to remain displayed during the movement of the perspective;
determining a velocity of the reference frame based on a displacement between the current real-world position and the real-world reference position;
determining an orientation of the perspective based on a real-world orientation of the head-mounted VR device; and
translating the reference frame in the VR environment at the velocity,
wherein the graphical indicator comprises a feature that indicates a direction of the velocity with respect to the orientation of the perspective, and
wherein the feature moves based on changes in the orientation of the perspective, such that the feature continues to indicate the direction of the velocity while the orientation of the perspective changes.

2. The VR control method of claim 1, wherein a speed of the velocity is based on a magnitude of the displacement between the current real-world position and the real-world reference position.

3. The VR control method of claim 1, wherein the direction of the velocity, with respect to a fixed coordinate system of the VR environment, is independent of the real-world orientation of the VR device.

4. The VR control method of claim 1, wherein the feature points in the direction of the velocity of the reference frame.

5. The VR control method of claim 1, wherein a direction of a predetermined portion of the graphical indicator with respect to the feature matches a direction of the real-world reference position with respect to the current real-world position of the VR device.

6. The VR control method of claim 1, wherein a distance between the feature and a predetermined portion of the graphical indicator is based on a magnitude of the displacement between the current real-world position of the VR device and the real-world reference position.

7. The VR control method of claim 1, wherein the perspective in the VR environment is based on a position of the reference frame, a local displacement with respect to the reference frame, and the orientation of the perspective, and wherein the VR control method comprises:
- determining a second real-world position of the head-mounted VR device;
- determining that the second real-world position does not satisfy a threshold condition with respect to the real-world reference position; and
- in response to determining that the second real-world position does not satisfy the threshold condition with respect to the real-world reference position,
  - altering the local displacement based on the second real-world position, and
  - setting the velocity of the reference frame to zero.

8. The VR control method of claim 1, wherein, for a range of magnitudes of the displacement up to at least a threshold value, a speed of the reference frame is a continuous function of a magnitude of the displacement, and
wherein the threshold value is between 2.5 feet and six feet.

9. The VR control method of claim 1, comprising:
- determining a second real-world position of the head-mounted VR device;
- determining that the second real-world position is beyond a real-world bound; and
- determining the velocity of the reference frame based on the determination that the second real-world position is beyond the real-world bound, wherein the graphical indicator comprises an indicator of the real-world bound with respect to the real-world reference position.

10. The VR control method of claim 1, wherein the graphical indicator comprises:
- a first graphical feature indicating the current real-world position of the head-mounted VR device; and
- a second graphical feature indicating the real-world reference position.

11. The VR control method of claim 10, comprising moving the first graphical feature based on real-world movements of the head-mounted VR device.

12. The VR control method of claim 10, wherein a relative positioning of the first graphical feature and the second graphical feature indicates a direction of the velocity.

13. The VR control method of claim 10, wherein a relative positioning of the first graphical feature and the second graphical feature is based on the real-world orientation of the VR device.

14. The VR control method of claim 10, wherein the first graphical feature comprises a marker, and wherein the second graphical feature comprises a ring.

15. A virtual reality (VR) headset, comprising:
- a display;
- an inertial measurement unit (IMU) comprising one or more sensors; and
- one or more computer systems configured to perform operations comprising:
  - determining, based on data from the IMU, a current real-world position of the VR headset;
  - displaying, on the display,
    - a VR environment, the VR environment presented from a first-person perspective in the VR environment that is defined with respect to a reference frame in the VR environment, and
    - a graphical indicator of the current real-world position of the VR headset with respect to a real-world reference position, wherein the graphical indicator is included in a head-up display (HUD) displayed on the display of the VR headset, and
    - wherein the graphical indicator tracks the perspective during movement of the perspective to remain displayed during the movement of the perspective;
  - determining a velocity of the reference frame based on a displacement between the current real-world position and the real-world reference position;
  - determining an orientation of the perspective based on a real-world orientation of the VR headset; and
  - translating the reference frame in the VR environment at the velocity,
  wherein the graphical indicator comprises a feature that indicates a direction of the velocity with respect to the orientation of the perspective, and
  wherein the feature moves based on changes in the orientation of the perspective, such that the feature continues to indicate the direction of the velocity while the orientation of the perspective changes.

16. The VR headset of claim 15, wherein a speed of the velocity is based on a magnitude of the displacement between the current real-world position and the real-world reference position.

17. The VR headset of claim 15, wherein the direction of the velocity, with respect to a fixed coordinate system of the VR environment, is independent of the real-world orientation of the VR headset.

18. The VR headset of claim 15, wherein the feature points in the direction of the velocity of the reference frame.

19. The VR headset of claim 15, wherein a direction of a predetermined portion of the graphical indicator with respect to the feature matches a direction of the real-world reference position with respect to the current real-world position of the VR headset.

20. The VR headset of claim 15, wherein a distance between the feature and a predetermined portion of the graphical indicator is based on a magnitude of the displacement between the current real-world position of the VR headset and the real-world reference position.

21. The VR headset of claim 15, wherein the perspective in the VR environment is based on a position of the reference frame, a local displacement with respect to the reference frame, and the orientation of the perspective, and wherein the one or more computer systems are configured to perform operations comprising:
- determining a second real-world position of the VR headset;
- determining that the second real-world position does not satisfy a threshold condition with respect to the real-world reference position; and
- in response to determining that the second real-world position does not satisfy the threshold condition with respect to the real-world reference position,
  - altering the local displacement based on the second real-world position, and
  - setting the velocity of the reference frame to zero.

22. The VR headset of claim 15, wherein the graphical indicator comprises:
- a first graphical feature indicating the current real-world position of the VR headset; and
- a second graphical feature indicating the real-world reference position.

23. The VR headset of claim 22, comprising moving the first graphical feature based on real-world movements of the VR headset.

24. The VR headset of claim 22, wherein a relative positioning of the first graphical feature and the second graphical feature indicates a direction of the velocity.

25. The VR headset of claim 22, wherein a relative positioning of the first graphical feature and the second graphical feature is based on the real-world orientation of the VR headset.

26. The VR headset of claim 22, wherein the first graphical feature comprises a marker, and wherein the second graphical feature comprises a ring.

27. A computer-implemented system, comprising:
one or more computers; and
one or more computer memory devices interoperably coupled with the one or more computers and having non-transitory machine-readable media storing one or more instructions that, when executed by the one or more computers, cause the one or more computers to perform one or more operations comprising:
displaying, by a head-mounted VR device,
a VR environment, the VR environment presented from a first-person perspective in the VR environment that is defined with respect to a reference frame in the VR environment, and
a graphical indicator of a current real-world position of the head-mounted VR device with respect to a real-world reference position, wherein the graphical indicator is included in a heads-up display (HUD) displayed by the head-mounted VR device, and
wherein the graphical indicator tracks the perspective during movement of the perspective to remain displayed during the movement of the perspective;
determining a velocity of the reference frame based on a displacement between the current real-world position and the real-world reference position;
determining an orientation of the perspective based on a real-world orientation of the head-mounted VR device; and
translating the reference frame in the VR environment at the velocity,
wherein the graphical indicator comprises a feature that indicates a direction of the velocity with respect to the orientation of the perspective, and
wherein the feature moves based on changes in the orientation of the perspective, such that the feature continues to indicate the direction of the velocity while the orientation of the perspective changes.

28. The computer-implemented system of claim 27, wherein a speed of the velocity is based on a magnitude of the displacement between the current real-world position and the real-world reference position.

29. The computer-implemented system of claim 27, wherein the direction of the velocity, with respect to a fixed coordinate system of the VR environment, is independent of the real-world orientation of the VR device.

30. The computer-implemented system of claim 27, wherein the graphical indicator comprises:
a first graphical feature indicating the current real-world position of the VR device; and
a second graphical feature indicating the real-world reference position.

31. One or more non-transitory computer-readable media storing instructions that, when executed by one or more computer systems, cause the one or more computer systems to perform operations comprising:
displaying, by a head-mounted VR device,
a VR environment, the VR environment presented from a first-person perspective in the VR environment that is defined with respect to a reference frame in the VR environment, and
a graphical indicator of a current real-world position of the head-mounted VR device with respect to a real-world reference position, wherein the graphical indicator is included in a heads-up display (HUD) displayed by the head-mounted VR device, and
wherein the graphical indicator tracks the perspective during movement of the perspective to remain displayed during the movement of the perspective;
determining a velocity of the reference frame based on a displacement between the current real-world position and the real-world reference position;
determining an orientation of the perspective based on a real-world orientation of the head-mounted VR device; and
translating the reference frame in the VR environment at the velocity,
wherein the graphical indicator comprises a feature that indicates a direction of the velocity with respect to orientation of the perspective, and
wherein the feature moves based on changes in the orientation of the perspective, such that the feature continues to indicate the direction of the velocity while the orientation of the perspective changes.

32. A virtual reality (VR) control method, comprising:
displaying, by a head-mounted VR device,
a VR environment, the VR environment presented from a first-person perspective in the VR environment that is defined with respect to a reference frame in the VR environment, and
a graphical indicator of a current real-world position of a portion of a user with respect to a real-world reference position, wherein the graphical indicator is included in a heads-up display (HUD) displayed by the head-mounted VR device, and
wherein the graphical indicator tracks the perspective during movement of the perspective to remain displayed during the movement of the perspective;
determining a velocity of the reference frame based on a displacement between the current real-world position and the real-world reference position;
determining an orientation of the perspective based on a real-world orientation of the portion of the user; and
translating the reference frame in the VR environment at the velocity,
wherein the graphical indicator comprises a feature that indicates a direction of the velocity with respect to the orientation of the perspective, and
wherein the feature moves based on changes in the orientation of the perspective, such that the feature continues to indicate the direction of the velocity while the orientation of the perspective changes.

* * * * *